(12) United States Patent
Wang et al.

(10) Patent No.: US 11,895,647 B2
(45) Date of Patent: Feb. 6, 2024

(54) METHOD FOR HARQ-ACK FEEDBACK OF SEMIPERSISTENT SCHEDULING DATA, UE, BASE STATION, DEVICE AND MEDIUM

(71) Applicant: Samsung Electronics Co., Ltd., Suwon-si (KR)

(72) Inventors: Yi Wang, Beijing (CN); Feifei Sun, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 17/417,984

(22) PCT Filed: Mar. 20, 2020

(86) PCT No.: PCT/KR2020/003906
§ 371 (c)(1),
(2) Date: Jun. 24, 2021

(87) PCT Pub. No.: WO2020/197195
PCT Pub. Date: Oct. 1, 2020

(65) Prior Publication Data
US 2022/0095337 A1 Mar. 24, 2022

(30) Foreign Application Priority Data

Mar. 22, 2019 (CN) .......................... 201910223783.2
Apr. 1, 2019 (CN) .......................... 201910258453.7
(Continued)

(51) Int. Cl.
*H04W 52/24* (2009.01)
*H04W 72/1273* (2023.01)
(Continued)

(52) U.S. Cl.
CPC ....... *H04W 72/1273* (2013.01); *H04L 1/1812* (2013.01); *H04L 5/0053* (2013.01); *H04W 72/21* (2023.01); *H04W 76/30* (2018.02)

(58) Field of Classification Search
None
See application file for complete search history.

(56) References Cited

U.S. PATENT DOCUMENTS 8,982,880 B2 3/2015 Stojanovski et al.
9,019,872 B2 * 4/2015 Papasakellariou ...... H04L 5/001
370/280

(Continued)

FOREIGN PATENT DOCUMENTS

EP 3 480 995 A1 5/2019
WO 2014/022862 A1 2/2014
WO 2019/050368 A1 3/2019

OTHER PUBLICATIONS

European Search Report dated Mar. 30, 2022, issued in European Application No. 20779076.7.
(Continued)

*Primary Examiner* — Sithu Ko
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). Embodiments of the present application provides a method for hybrid automatic repeat-request HARQ-ACK feedback of semi-persistent scheduling data, applied to a user equipment UE, the method including: determining, according to first information, a physical uplink control channel (PUCCH) resource for the HARQ-ACK feedback, wherein the first information includes at least one of HARQ-ACK feedback timing, the number of bits of the HARQ-ACK of semi-
(Continued)

persistent scheduling physical downlink shared channel (SPS PDSCH) to be reported, and the number of the SPS PDSCHs corresponding to the HARQ-ACK to be reported, a PUCCH resource set, and a PUCCH period; performing the HARQ-ACK feedback according to the PUCCH resource for the HARQ-ACK feedback and a HARQ-ACK codebook. The present application improves the efficiency of the HARQ-ACK feedback of the SPS PDSCH.

20 Claims, 16 Drawing Sheets

(30) Foreign Application Priority Data

| Apr. 30, 2019 | (CN) | 201910363785.1 |
|---|---|---|
| Sep. 30, 2019 | (CN) | 201910940776.4 |
| Nov. 7, 2019 | (CN) | 201911083210.0 |

(51) Int. Cl.

| H04W 76/30 | (2018.01) |
|---|---|
| H04L 1/1812 | (2023.01) |
| H04L 5/00 | (2006.01) |
| H04W 72/21 | (2023.01) |

(56) References Cited

U.S. PATENT DOCUMENTS

| 9,191,930 B2* | 11/2015 | Papasakellariou | H04L 5/0055 |
|---|---|---|---|
| 10,313,062 B2* | 6/2019 | Hwang | H04L 1/1812 |
| 10,735,146 B2* | 8/2020 | Wang | H04L 1/1854 |
| 10,790,942 B2* | 9/2020 | Wang | H04B 7/0626 |
| 10,952,231 B2* | 3/2021 | Liou | H04W 72/046 |
| 10,993,141 B2* | 4/2021 | Huang | H04L 1/1812 |
| 11,082,195 B2* | 8/2021 | Yang | H04L 27/0006 |
| 11,323,208 B2* | 5/2022 | Gao | H04W 72/04 |
| 11,343,024 B2* | 5/2022 | Yin | H04L 5/0055 |
| 2018/0145796 A1* | 5/2018 | Liang | H04L 1/1896 |
| 2019/0045489 A1 | 2/2019 | He et al. | |
| 2020/0358487 A1 | 11/2020 | Yang et al. | |
| 2021/0368453 A1* | 11/2021 | Lee | H04W 52/146 |

OTHER PUBLICATIONS

Motorola Mobility et al., "HARQ enhancement for URLLC", R1-1900940, 3GPP TSG RAN WG1 #AH1901, Taipei, Jan. 12, 2019.

ZTE., "On scheduling/HARQ processing timeline for Urllc", R1-1900072, 3GPP TSG RAN WG1 #AH1901, Taipei, Jan. 12, 2019.

Samsung, "DL ControlEnhancements for URLLC", R1-1902296, 3GPP TSG RAN WG1 #96, Athens, Greece, Feb. 15, 2019.

Qualcomm Incorporated, "Summary for Rel-15 DL/UL data scheduling and HARQ procedure", R1-1811891, 3GPP TSG RAN WG1 #94bis, Chengdu, China, Oct. 9, 2018.

Ericsson, On configurable wideband PRG size for TM9 and TM10, 3GPP tsg_rantwg1_rl1, R1-1811191, Sep. 29, 2018, Chengdu, P.R. China.

Motorola Mobility et al., HARQ enhancement for Urllc, 3GPP tsg_ran\wg1_rl1, Draft_Minutes_report_RAN1#AH_1901_v010, R1-1901318, Jan. 28, 2019, Taipei.

RAN1, Status report for SI: Study on physical layer enhancements for NR ultra-reliable and low latency case (URLLC); rapporteur: Huawei, 3GPP TSG RAN meeting #83, RP-190339, Mar. 12, 2019, Shenzhen, China.

Chinese Notice of Allowance dated Apr. 28, 2023, issued in Chinese Application No. 201911083210.0.

* cited by examiner

METHOD FOR HARQ-ACK FEEDBACK OF SEMIPERSISTENT SCHEDULING DATA, UE, BASE STATION, DEVICE AND MEDIUM

TECHNICAL FIELD

The present application relates to the field of wireless communication technologies, and in particular, to a method for HARQ-ACK feedback of semi-persistent scheduling data, a UE, a base station, a device, and a computer readable storage medium.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Ultra-reliable low-latency communication (URLLC) proposed in fifth-generation mobile communication technology (Fifth-Generation, 5G) puts forward the requirement for both latency and reliability. 3GPP Rel-15 may support less than 1 ms end-to-end latency and $10^5$ block error rate. With the traffic growth in Industrial Internet of things, Augmented Reality (AR), Virtual Reality (VR) and on the like, more stringent requirements are imposed for URLLC, for example, 3GPP Rel-16 has learned about the URLLC with higher requirements, in which is required to support the 0.5 ms~1 ms end-to-end latency and $10^{-6}$ block error rate, which brings challenges for the New Radio (NR) communication system.

At present, downlink transmission method based on semi-persistent scheduling (SPS) in the NR system only supports one SPS configuration, and the SPS downlink transmission period is at least 10 ms. Obviously, one SPS configuration is difficult to support URLLC requirements for multiple services, and the 10 ms period is far from satisfying the latency requirement of 1 ms. When the multiple SPS configurations are introduced, the base station may allocate different time-frequency domain resources for each SPS configuration, for example, allocating more frequency domain resources for a URLLC service with larger traffic volume, and allocating less frequency domain resources and short period for the URLLC service with smaller traffic volume but much high latency requirements. Introducing multiple SPS configurations can also better support the low latency requirements of the same URLLC service. For example, multiple SPS configurations are allocated for the same URLLC service, and the latency between twice adjacent SPS transmissions is reduced by staggering the time resources of each SPS configuration. Another method of reducing the SPS transmission latency is to support transmission of multiple mini-slots (or non-slots) in one slot, that is, the period of SPS transmission is less than one slot, for example, 2 symbols. How to efficiently schedule data transmission of various SPS configurations and how to perform hybrid automatic repeat-request HARQ-ACK feedback according to these data transmissions are problems to be solved.

DISCLOSURE OF INVENTION

Technical Problem

How to efficiently schedule data transmission of various SPS configurations and how to perform hybrid automatic repeat-request HARQ-ACK feedback according to these data transmissions are problems to be solved.

Solution to Problem

For the defects in the prior art, the present application provides a method for HARQ-ACK feedback of semi-persistent scheduling data, a UE, a base station, a device, and a computer readable storage medium for solving the problem of how to implement efficient hybrid automatic repeat-request HARQ-ACK feedback.

In a first aspect, a method for HARQ-ACK feedback of semi-persistent scheduling data is provided, which is applied to UE, including:

determining, according to first information, a physical uplink control channel PUCCH resource for the HARQ-ACK feedback, wherein the first information includes at least one of HARQ-ACK feedback timing, the number of bits of the HARQ-ACK of semi-persistent scheduling physical downlink shared channel SPS PDSCH to be reported, and the number of the SPS PDSCH corresponding to the HARQ-ACK to be reported, a PUCCH resource set, and a PUCCH period; performing the HARQ-ACK feedback according to the PUCCH resource for the HARQ-ACK feedback and a HARQ-ACK codebook.

In a second aspect, a method for HARQ-ACK feedback of semi-persistent scheduling data is provided, which is applied to base station, including:

transmitting configuration information of one or more SPS PDSCH configurations to a UE;

Transmitting, to the UE, HARQ-ACK feedback timing, for the UE to determine a HARQ-ACK codebook, an uplink time unit where the HARQ-ACK is located, and an PUCCH resource in the uplink time unit according to the configuration information of the SPS PDSCH configuration and the HARQ-ACK feedback timing;

receiving the HARQ-ACK feedback of the UE.

In a third aspect, a UE is provided, including:

a first processing module, configured to determine, according to the first information, a physical uplink control channel PUCCH resource for the HARQ-ACK feedback, wherein the first information includes at least one of HARQ-ACK feedback timing, the number of bits of the HARQ-ACK of the semi-persistent scheduling physical downlink shared channel SPS PDSCH to be reported, and the number of SPS PDSCH corresponding to the HARQ-ACK to be reported, a PUCCH resource set, and a PUCCH period;

a second processing module, configured to determine, according to the first information, a physical uplink control channel PUCCH resource for the HARQ-ACK feedback.

In a fourth aspect, a base station is provided, including:

a third processing module, configured to transmit configuration information of one or more SPS PDSCH configurations to the UE;

a fourth processing module, configured to transmit, to the UE, HARQ-ACK feedback timing, for the UE to determine a HARQ-ACK codebook, an uplink time unit where the HARQ-ACK is located, and an PUCCH resource in the uplink time unit according to the configuration information of the SPS PDSCH configuration and the HARQ-ACK feedback timing;

a fifth processing module, configured to receive HARQ-ACK feedback of the UE.

In a fifth aspect, a user equipment is provided, including: a processor; and a memory configured to store machine readable instructions that, when executed by the processor, cause the processor performing the method for HARQ-ACK feedback of semi-persistent scheduling data in the first aspect.

In a sixth aspect, a base station device is provided, including: a processor;

a memory configured to store machine readable instructions that, when executed by the processor, cause the processor performing the method for HARQ-ACK feedback of semi-persistent scheduling data in the second aspect.

In a seventh aspect, the present application provides a computer readable storage medium storing a computer program for performing the method for HARQ-ACK feedback of semi-persistent scheduling data in the first aspect.

In an eighth aspect, the present application provides a computer readable storage medium storing a computer program for performing the method for HARQ-ACK feedback of semi-persistent scheduling data in the second aspect.

The technical solutions provided by the embodiments of the present application have at least the following beneficial effects:

The efficiency of the HARQ-ACK feedback of the SPS PDSCH is improved.

The aspects and advantages of the present application will be set forth in part in the description below, and these will become apparent from the description below or through the practice of the present application.

Advantageous Effects of Invention

The present application improves the efficiency of the HARQ-ACK feedback of the SPS PDSCH.

BRIEF DESCRIPTION OF DRAWINGS

For more clearly illustrating the technical solutions in the embodiments of the present application, the drawings used in the description of the embodiments of the present application will be briefly described below.

MODE FOR THE INVENTION

Figure 1:
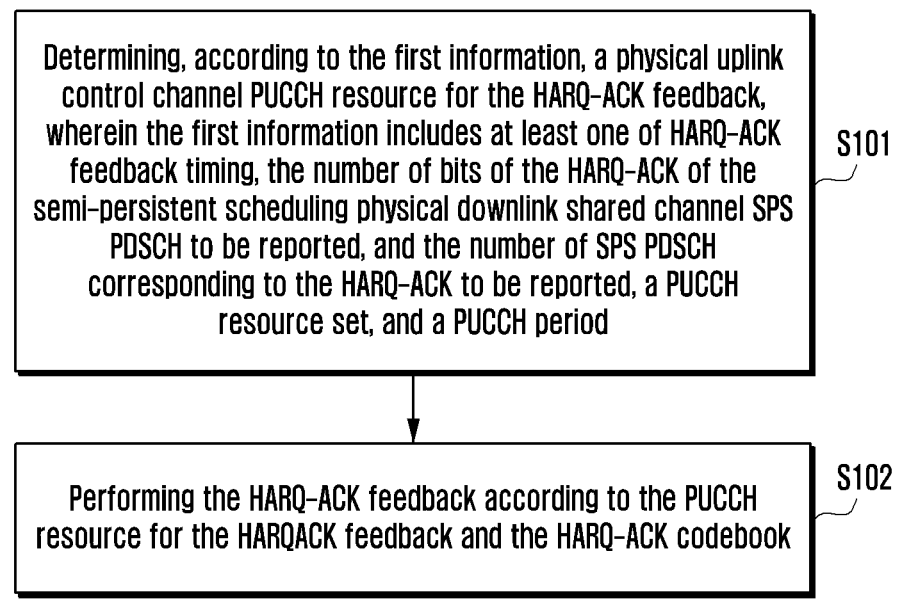
FIG. 1 is a schematic flowchart of a method for HARQ-ACK feedback of semi-persistent scheduling data according to an embodiment of the present application.

Embodiments of the present application will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present application and should not be regarded as any limitations thereto.

It should be understood by those skilled in the art that singular forms "a", "an", "the", and "said" may be intended to include plural forms as well, unless otherwise stated. It should be further understood that terms "include/including" used in this specification specify the presence of the features, integers, steps, operations, elements and/or components, but not exclude the presence or addition of one or more other features, integers, steps, operations, elements, components, and/or combinations thereof. It should be understood that when an element is referred to as being "connected to" or "coupled to" another element, it may be directly connected or coupled to other elements, or intervening element is provided with therebetween. In addition, "connected to" or "coupled to" as used herein may include wireless connection or coupling. As used herein, term "and/or" includes all or any of one or more associated listed items or combinations thereof.

In order to make the objects, technical solutions and advantages of the present application more clear, the embodiments of the present application will be further described in detail below with reference to the accompanying drawings.

Embodiment 1

A method for the HARQ-ACK feedback of the semi-persistent scheduling data is applied to the UE. The schematic flowchart of the method is as shown in FIG. 1, and the method includes:

Step S101: determining, according to the first information, a physical uplink control channel PUCCH resource for the HARQ-ACK feedback, wherein the first information includes at least one of HARQ-ACK feedback timing, the number of bits of the HARQ-ACK of the semi-persistent scheduling physical downlink shared channel SPS PDSCH to be reported, and the number of SPS PDSCH corresponding to the HARQ-ACK to be reported, a PUCCH resource set, and a PUCCH period.

Step S102: performing the HARQ-ACK feedback according to the PUCCH resource for the HARQ-ACK feedback and the HARQ-ACK codebook.

In the embodiment of the present application, the UE determines, according to the first information, a physical uplink control channel PUCCH resource for the HARQ-ACK feedback, wherein the first information includes at least one of HARQ-ACK feedback timing, the number of bits of the HARQ-ACK of the SPS PDSCH to be reported, and the number of SPS PDSCH corresponding to the HARQ-ACK to be reported, a PUCCH resource set, and a PUCCH period. The UE performs HARQ-ACK feedback according to the PUCCH resource for the HARQ-ACK feedback and the HARQ-ACK codebook. In this way, the HARQ-ACK feedback efficiency of the SPS PDSCH is improved.

Alternatively, determining, according to the first information, the PUCCH resource for the HARQ-ACK feedback includes at least one of the following processes:

determining, according to the HARQ-ACK feedback timing, an uplink time unit in which the HARQ-ACK is located and the PUCCH resource for the HARQ-ACK feedback in the uplink time unit;

determining the PUCCH resource for the HARQ-ACK feedback according to the number of bits of the HARQ-ACK of the SPS PDSCH to be reported or the number of the SPS PDSCH corresponding to the HARQ-ACK to be reported, and the PUCCH resource set.

It is to be noted that, the PUCCH resource is determined according to the number of bits of the HARQ-ACK of the SPS PDSCH to be reported, and the PUCCH resource set; the PUCCH resource is determined according to the number of SPS PDSCH corresponding to the HARQ-ACK to be reported, and the PUCCH resource set.

Alternatively, determining, according to the HARQ-ACK feedback timing, the uplink time unit in which the HARQ-ACK is located and the PUCCH resource in the uplink time unit includes any one of the following processes:

determining, by the HARQ-ACK feedback timing, an uplink time unit in which the HARQ-ACK feedback of each SPS PDSCH is located, and determining the PUCCH resource for the HARQ-ACK feedback in the uplink time unit;

determining, by the HARQ-ACK feedback timing and a UE PDSCH processing time requirement, the uplink time unit in which the HARQ-ACK feedback of each SPS PDSCH is located, and determining the PUCCH resource for the HARQ-ACK feedback in the uplink time unit;

determining, by the HARQ-ACK feedback timing, PUCCH resource of first SPS PDSCH, and determining a PUCCH resource of each SPS PDSCH by a time offset of the adjacent PUCCH resources;

determining, by the HARQ-ACK feedback timing, PUCCH resource of the first SPS PDSCH, and determining a PUCCH resource of each SPS PDSCH by the PUCCH period of the SPS PDSCH.

In this way, HARQ-ACK feedback of multiple SPS PDSCHs in one downlink slot can be efficiently supported.

Alternatively, performing the HARQ-ACK feedback includes at least one of the following:

uniquely determining one PUCCH resource for each SPS PDSCH, and transmitting HARQ-ACK of the one SPS PDSCH;

uniquely determining one PUCCH resource for each SPS PDSCH, and transmitting at least one HARQ-ACK of the one SPS PDSCH;

transmitting the HARQ-ACK of each SPS PDSCH in the PUCCH resource in the same uplink time unit, for each SPS PDSCH located in the downlink time unit corresponding to the same uplink time unit;

transmitting the HARQ-ACK of the SPS PDSCH that satisfies the UE PDSCH processing time requirement in the PUCCH resource in the same uplink time unit, for each SPS PDSCH located in the downlink time unit corresponding to the same uplink time unit; transmitting the HARQ-ACK in the PUCCH resource in the next uplink time unit that satisfies the UE PDSCH processing time requirement, for the SPS PDSCH that does not satisfy the UE PDSCH processing time requirement.

Alternatively, the uplink time unit includes any one of the following:

an uplink slot, an uplink sub-slot, and time domain resources of one PUCCH.

Alternatively, determining the PUCCH resource according to the number of bits of the HARQ-ACK of the SPS PDSCH to be reported or the number of SPS PDSCH corresponding to the HARQ-ACK to be reported, and the PUCCH resource set, includes any one of the following:

determining the PUCCH resource based on multiple PUCCH resources in the configured PUCCH resource set, in which the maximum number of bits of the HARQ-ACK that can be supported by each PUCCH resource is different, according to the number of bits of the HARQ-ACK of the SPS PDSCH to be reported or the number of SPS PDSCH corresponding to the HARQ-ACK to be reported;

determining the PUCCH resource based on first PUCCH resource for transmitting HARQ-ACK of each SPS PDSCH configuration and second PUCCH resource for transmitting HARQ-ACKs of multiple SPS PDSCH configurations in the configured PUCCH resource set, according to the number of bits of the HARQ-ACK of the SPS PDSCH to be reported or the number of SPS PDSCH corresponding to the HARQ-ACK to be reported;

determining the PUCCH resource based on a first PUCCH resource for transmitting HARQ-ACK for each SPS PDSCH configuration in the configured PUCCH resource set, according to the number of bits of the HARQ-ACK to be reported or the number of SPS PDSCH corresponding to the HARQ-ACK to be reported.

Alternatively, the priority of the SPS PDSCH configuration is determined according to a first preset rule, when the configured PUCCH resource set not including the PUCCH resource for simultaneously transmitting the HARQ-ACK for multiple SPS PDSCH configurations, and the PUCCH resources are determined by selecting the SPS PDSCH configuration with highest priority. Alternatively, the priority of the SPS PDSCH configuration is determined according to the first preset rule, and multiple PUCCH resources are determined by selecting multiple SPS PDSCH configuration according to the order of priority from high to low.

Alternatively, the first preset rule includes at least one of the followings:

as the index of the SPS configuration increases, the priority increases monotonically;

as the index of the SPS HARQ process increases, the priority increases monotonically;

as the priority of the service type carried by the physical downlink shared channel PDSCH increases, the priority increases monotonically;

as the index of the serving cell increases, the priority increases monotonically.

Alternatively, according to the PUCCH resource for the HARQ-ACK feedback and the HARQ-ACK codebook, before performing the HARQ-ACK feedback, the following is further included:

determining bit location of the HARQ-ACK of the multiple SPS PDSCHs in the HARQ-ACK codebook according to a second preset rule.

Alternatively, the second preset rule includes at least one of the followings:

Within one carrier, arranging the HARQ-ACK bits in ascending order according to HARQ process ID of the configured SPS PDSCH;

Within one carrier, arranging the HARQ-ACK bits in ascending order according to the SPS configuration index of the SPS PDSCH;

Within one carrier, arranging the HARQ-ACK bits according to the index of the SPS configuration of the SPS PDSCH and the index of configured HARQ process within each configuration;

Within one carrier, arranging the HARQ-ACK bits according to the chronological order of start orthogonal frequency division multiplexing (OFDM) symbol of the configured SPS PDSCH;

arranging the HARQ-ACK bits according to ascending order of value of downlink allocation indication (DAI).

Alternatively, the second information is acquired; the number of the HARQ-ACK bits is determined according to the second information, and a PUCCH power is determined according to the number of HARQ-ACK bits;

Performing HARQ-ACK feedback includes performing HARQ-ACK feedback using the PUCCH power.

Alternatively, the second information includes any one of the following:

the activated SPS PDSCH, the actually received SPS PDSCH, and the SPS PDSCH transmitted by the base station assumed by the UE.

In this way, the transmission power efficiency of the PUCCH that transmits the HARQ-ACK can be improved.

Figure 2:
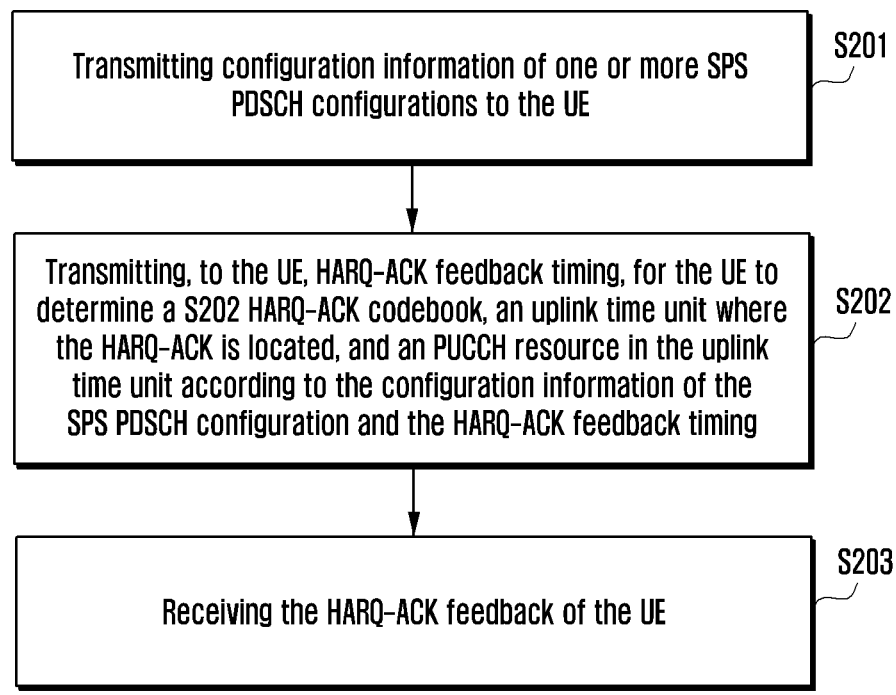
FIG. 2 is a schematic flowchart of another method for HARQ-ACK feedback of semi-persistent scheduling data according to an embodiment of the present application.

Another method for the HARQ-ACK feedback is provided in the embodiment of the present application, which is applied to a base station. The schematic flowchart of the method is as shown in FIG. 2, and the method includes:

Step S201: transmitting configuration information of one or more SPS PDSCH configurations to a UE.

The configuration information of the SPS PDSCH configuration includes at least a transmission parameter of the SPS PDSCH and a PUCCH resource set of the HARQ-ACK feedback of the SPS PDSCH.

Alternatively, the step S201 includes: transmitting, to the UE, the configuration information of the SPS PDSCH configuration which includes multiple PUCCH resources, wherein the maximum number of HARQ-ACK bits that can be supported by each s PUCCH resource is different; or, transmitting, to the UE, configuration information of the SPS PDSCH configuration which includes a first PUCCH resources for transmitting HARQ-ACK of each SPS PDSCH configuration and a second PUCCH resource for transmitting HARQ-ACKs of multiple SPS PDSCH configurations.

Step S202: transmitting, to the UE, HARQ-ACK feedback timing, for the UE to determine a HARQ-ACK codebook, an uplink time unit where the HARQ-ACK is located, and an PUCCH resource in the uplink time unit according to the configuration information of the SPS PDSCH configuration and the HARQ-ACK feedback timing.

Alternatively, the HARQ-ACK feedback timing is transmitted to the UE, for the UE to determine the PUCCH resource of first SPS PDSCH according to the HARQ-ACK feedback timing;

the time offset of the adjacent PUCCH resources is transmitted to the UE, for the UE to determine the PUCCH resource of each SPS PDSCH according to the time offset of the adjacent PUCCH resources.

Alternatively, the HARQ-ACK feedback timing is transmitted to the UE, for the UE to determine the PUCCH resource of first SPS PDSCH according to the HARQ-ACK feedback timing;

the PUCCH period is transmitted to the UE for the UE to determine the PUCCH resource of each SPS PDSCH according to the PUCCH period.

Step S203: receiving the HARQ-ACK feedback of the UE.

Applying the embodiments of the present application, there are at least the following beneficial effects:

the efficiency of HARQ-ACK feedback of the SPS PDSCH is improved.

Embodiment 2

The method for HARQ-ACK feedback of semi-persistent scheduling data in the first embodiment of the present application is described in detail in the following embodiments:

The first aspect of the present application provides a method, in which determines the PUCCH resource where the HARQ-ACK feedback is located.

If the UE only reports the HARQ-ACK of the downlink transmission that is not based on the PDCCH dynamic scheduling in one uplink time unit, the UE will select one PUCCH for transmitting the HARQ-ACK from among the PUCCH resources for the HARQ-ACK of the downlink transmission that is not based on the PDCCH dynamic scheduling, configured by base station, in the uplink time unit.

Alternatively, the downlink transmission that is not based on PDCCH dynamic scheduling includes a semi-persistent scheduling (SPS) PDSCH. In the following description, the SPS PDSCH is taken as an example to describe a downlink transmission that is not based on PDCCH dynamic scheduling.

In some scenarios, the base station configures SPS PDSCH resources, such as the number of HARQ processes, the period, the PUCCH resource, and the MCS table, by using the high layer signaling, and the base station activates the SPS PDSCH (SPS Activation DCI) by using Downlink control information (DCI), indicating the information of the SPS PDSCH, for example frequency domain resources, time information such as time offset, reference signal DMRS, HARQ-ACK timing and the like. After the UE receives the activation signaling, the UE periodically receives the SPS PDSCH at a corresponding time-frequency position (referred to as an SPS PDSCH transmission occasion). For convenience of description, it is called the second type of SPS PDSCH. In some scenarios, the base station configures all resource information of the SPS PDSCH and HARQ-ACK feedback resource information through high layer signaling. After receiving the configuration information, the UE periodically receives the SPS PDSCH at a corresponding time-frequency position (referred to as an SPS PDSCH transmission occasion) and transmits the HARQ-ACK. For convenience of description, it is called the first type of SPS PDSCH. This application applies to both types of SPS PDSCHs, but is not limited to these two types of SPS PDSCHs.

If, in one uplink time unit, the UE reports both the PDCCH-based HARQ-ACK, for example, the PDCCH-based PDSCH, or the SPS de-activated PDCCH (SPS Deactivation DCI), and the HARQ-ACK of SPS PDSCH, then the UE will select the PUCCH resource of the PDCCH-based HARQ-ACK to transmit all HARQ-ACKs in this uplink time unit. Alternatively, the UE determines whether the PDCCH-based HARQ-ACK and the HARQ-ACK that is not based on the PDCCH dynamic scheduling downlink transmission are transmitted at the same time, according to the method for determining the PUCCH resource when only reporting the HARQ-ACK of downlink transmission that is not based on the PDCCH dynamically scheduled described in the present invention. For example, if the PUCCH resource of the HARQ-ACK of the downlink transmission that is not based on the PDCCH dynamic scheduling is located in the same uplink time unit as the PUCCH resource of the PDCCH-based HARQ-ACK, or the PUCCH resource of the HARQ-ACK of the downlink transmission that is not based on the PDCCH dynamic scheduling overlaps with the PUCCH resource of the PDCCH-based HARQ-ACK in the time domain, and it is necessary to consider how two HARQ-ACKs are transmitted together.

Alternatively, the uplink time unit is an uplink slot, or an uplink sub-slot, or a time domain resource of a PUCCH.

Alternatively, the PUCCH resource is configured by the base station by using high layer signaling, and/or is dynamically indicated by high layer signaling configuration and physical layer signaling.

Alternatively, the PUCCH resource of the first SPS PDSCH activated by the DCI is jointly indicated by the high layer signaling configuration and the physical layer signaling, for example, the high layer signaling configures the N PUCCH resources, and the physical layer signaling indicates one of the PUCCH resources (PRI). Such a PUCCH resource is referred to as a first type of PUCCH resource.

Alternatively, the subsequent SPS PDSCH does not have a corresponding DCI, and therefore the PUCCH resources cannot be indicated through physical layer signaling. Or for the first type of SPS PDSCH, the DCI is not activated, but the activation is achieved by transmitting the high layer signaling configuration. Such PUCCH resources of the SPS PDSCH are configured by higher layer signaling, such as n1 PUCCH-AN in TS 38.331. Such a PUCCH resource is referred to as a second type of PUCCH resource.

Alternatively, the PUCCH resource of the first SPS PDSCH activated by the DCI is jointly indicated by the high layer signaling configuration and the physical layer signaling. The subsequent PUCCH resource of the SPS PDSCH is the same with the PUCCH resource of the first SPS PDSCH. In this case, the first type and the second type of PUCCH resource are the same.

Alternatively, if there are the first type of PUCCH resources and the second type of PUCCH resource in the same uplink time unit, the HARQ-ACK of each SPS PDSCH is transmitted on the first type of PUCCH resource. For example, if there are one HARQ-ACK of the first SPS PDSCH after the activation of the DCI by SPS PDSCH configuration to be transmitted, and another HARQ-ACK of the subsequent SPS PDSCH for the SPS PDSCH configuration to be transmitted in the same uplink sub slot, the HARQ-ACKs of the two SPS PDSCHs are transmitted on the first type of PUCCH resource.

The HARQ-ACK feedback of the SPS PDSCH includes determining an uplink time unit in which the HARQ-ACK is located and a PUCCH resource in the uplink time unit. Alternatively, it can be performed according to at least one of the following methods:

according to the HARQ-ACK timing, the uplink time unit in which the HARQ-ACK is located and the PUCCH resource in the uplink time unit are determined.

Alternatively, for one SPS PDSCH configuration, the base station indicates the HARQ-ACK timing of the SPS PDSCH configuration by activating DCI. If multiple SPS PDSCH configurations can be activated by a single DCI, these SPS PDSCH configurations share the same HARQ-ACK timing, or each SPS PDSCH configuration has one HARQ-ACK timing respectively.

In some scenarios, the configured SPS PDSCH period is less than one slot, for example, the period is 2 symbols, and there are 7 SPS PDSCHs in one slot. The HARQ-ACKs of the seven SPS PDSCHs are aggregated in one PUCCH resource as much as possible to reduce the cost of PUCCH resource and maintain a relatively short HARQ-ACK feedback latency; or, the HARQ-ACKs of the 7 SPS PDSCHs respectively correspond to different PUCCH resources, so that the base station can obtain the HARQ-ACK of each SPS PDSCH in time, but the cost of the PUCCH resource is relatively large.

Alternatively, the first implementation manner is: the UE determines, by using a HARQ-ACK timing indicated by the base station, an uplink time unit in which the HARQ-ACK feedback of each SPS PDSCH is located. For each SPS PDSCH located in the downlink time unit corresponding to the same uplink time unit, the HARQ-ACK feedback of these PDSCHs is located in the same uplink time unit. The UE transmits the HARQ-ACK by the PUCCH resource in the uplink time unit.

Wherein, the PUCCH resource in the uplink time unit is configured by the base station by using high layer signaling, and/or is dynamically indicated by high layer signaling configuration and physical layer signaling.

Wherein, when indicating the HARQ-ACK timing, the base station needs to ensure that the time difference from the first symbol start position of the PUCCH resource in the uplink time unit pointed to by the HARQ-ACK timing to the last symbol end position of all PDSCHs corresponding to the HARQ-ACK carried by the PUCCH is not less than the UE PDSCH processing time. The UE PDSCH processing time is related to the UE capability and may be predefined by standard, such as the definition of UE PDSCH processing procedure time in section 5.3 of TS 38.214.

Alternatively, the UE PDSCH processing time also needs to consider the length of time of the PDSCH and the time difference between adjacent PDSCHs. For example, an SPS PDSCH with a period of 2 symbols, and each SPS PDSCH occupies 2 symbols, that is, adjacent SPS PDSCHs are continuous in time. For some low-end UEs, multiple PDSCHs cannot be processed at the same time. The partial receiving module of the previous PDSCH is to be processed before the next PDSCH can be processed. For example, after the completion of the channel estimation of the previous PDSCH, the channel estimation of the second PDSCH can be started. In this case, for the second PDSCH, the time from UE receiving one PDSCH to UE processing the one PDSCH includes not only the UE PDSCH processing time, but also the delay time for the second PDSCH to start processing due to waiting for the previous PDSCH to be processed. For some UEs with strong processing capability, multiple PDSCHs may be processed in parallel at the same time, and it may be unnecessary to consider the influence of the previous PDSCH on the subsequent PDSCH processing time.

Figure 3:
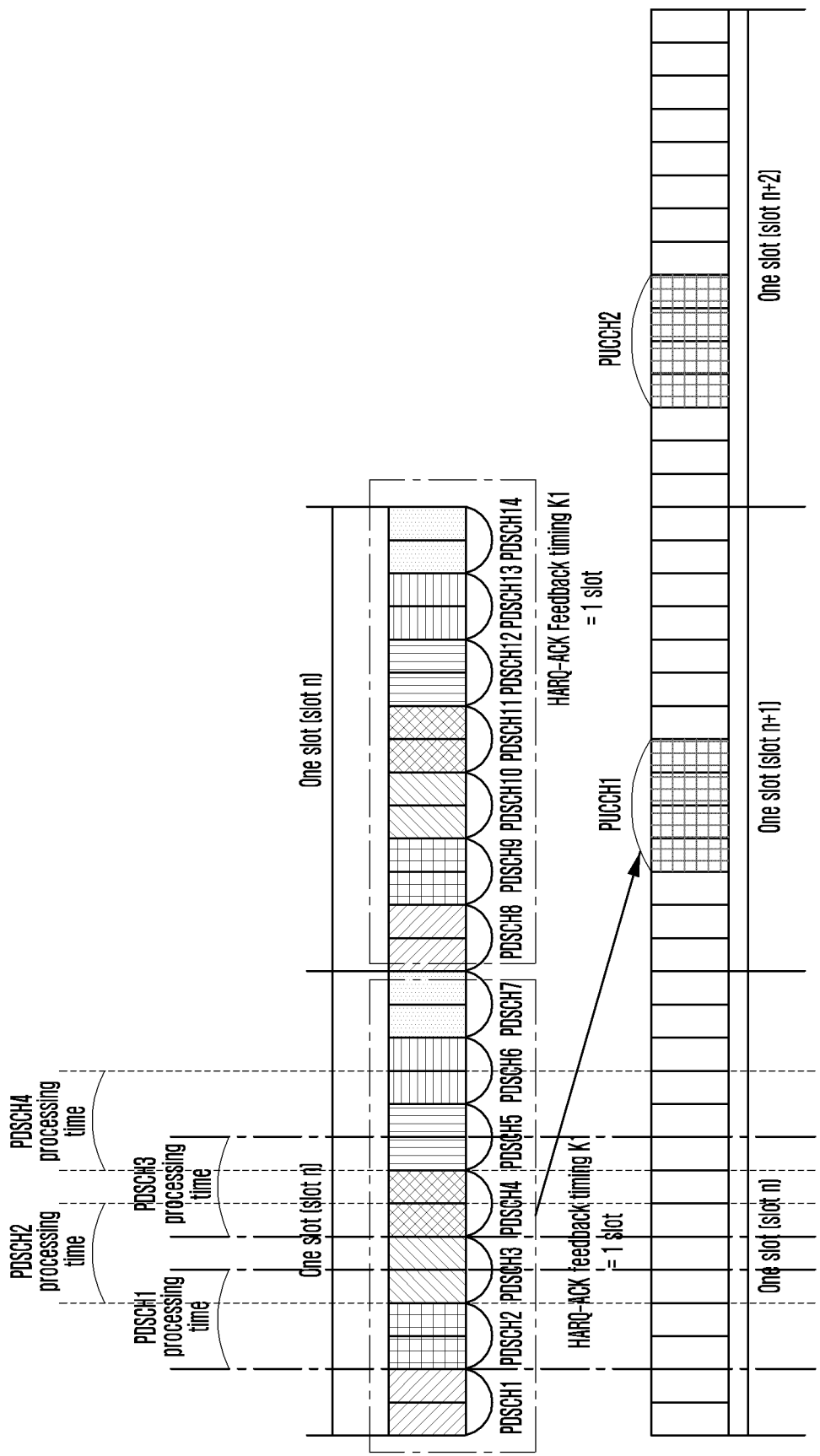
FIG. 3 is a schematic diagram of PUCCH resources for HARQ-ACK feedback according to an embodiment of the present application.

Alternatively, it is assumed that the UE PDSCH processing procedure time is 3 OFDM symbols. As shown in FIG. 3, the base station indicates that the HARQ-ACK timing is 1 slot through the SPS Activation DCI, or the base station configures the HARQ-ACK timing as one slot by using the high layer signaling, and the start symbol of the PUCCH resource is the 4th OFDM symbol in one slot. Then, for PDSCHs 1 to 7 in one downlink slot n corresponding to the same uplink slot n, the HARQ-ACKs of the 7 PDSCHs are all transmitted in the same PUCCH, that is, PUCCH1 of the uplink time slot n+1. The base station needs to ensure that for these 7 PDSCHs, the UE has sufficient PDSCH processing procedure time to generate HARQ-ACK and transmit it on PUCCH1. As shown in FIG. 3, it is assumed that the UE can process the receptions of two PDSCHs in parallel, one processing branch processes PDSCH1, 3, 5, 7 . . . respectively, and the other processing branch processes PDSCH2, 4, 6, . . . . In one processing branch, the processing time of each PDSCH is not affected by the previous PDSCH processing time. Similarly, the HARQ-ACKs of the PDSCH8~14 in slot n+1 are transmitted on PUCCH2 on slot n+2.

Alternatively, the resources of the PUCCH1 in the figure are the first type of PUCCH resources, and the resources of the PUCCH2 are the second type of PUCCH resources.

Alternatively, the second implementation manner is: the UE determines, by using a HARQ-ACK timing indicated by the base station, an uplink time unit in which the HARQ-ACK feedback of each SPS PDSCH is located. For each SPS PDSCH located in the downlink time unit corresponding to the same uplink time unit, the HARQ-ACK of the SPS PDSCH that satisfies the UE PDSCH processing time requirement is transmitted in the PUCCH resource in the same uplink time unit; for the SPS PDSCH that does not satisfy the UE PDSCH processing time requirement, the HARQ-ACK feedback is transmitted in the PUCCH resource in the next uplink time unit that satisfies the UE PDSCH processing time requirement. The time difference between one SPS PDSCH and one PUCCH resource in an uplink time unit satisfying the UE PDSCH processing time is defined as: the time between the last symbol of the PDSCH to the first symbol of the PUCCH resource determined by the HARQ-ACK timing and the PUCCH resource indication >=UE PDSCH processing time. The next uplink time unit and the PUCCH resource that satisfy the UE PDSCH processing time requirement are determined by the HARQ-ACK timing and PUCCH resources for the SPS PDSCH indicated by the base station.

The UE PDSCH processing time is related to the UE capability and may be predefined by standard, such as the definition of UE PDSCH processing procedure time in section 5.3 of TS 38.214.

Alternatively, the UE PDSCH processing time also needs to consider the length of time of the PDSCH and the time difference between adjacent PDSCHs. For some low-end (low-end) UEs, multiple PDSCHs cannot be processed at the same time. For the second PDSCH, the time from UE receiving the PDSCH to UE processing the PDSCH includes not only the UE PDSCH processing time but also a delay time for the second PDSCH to start processing due to processing the previous PDSCH. For some UEs with strong processing capability, multiple PDSCHs may be processed in parallel at the same time, and it may be unnecessary to consider the influence of the previous PDSCH on the subsequent PDSCH processing time.

Figure 4:
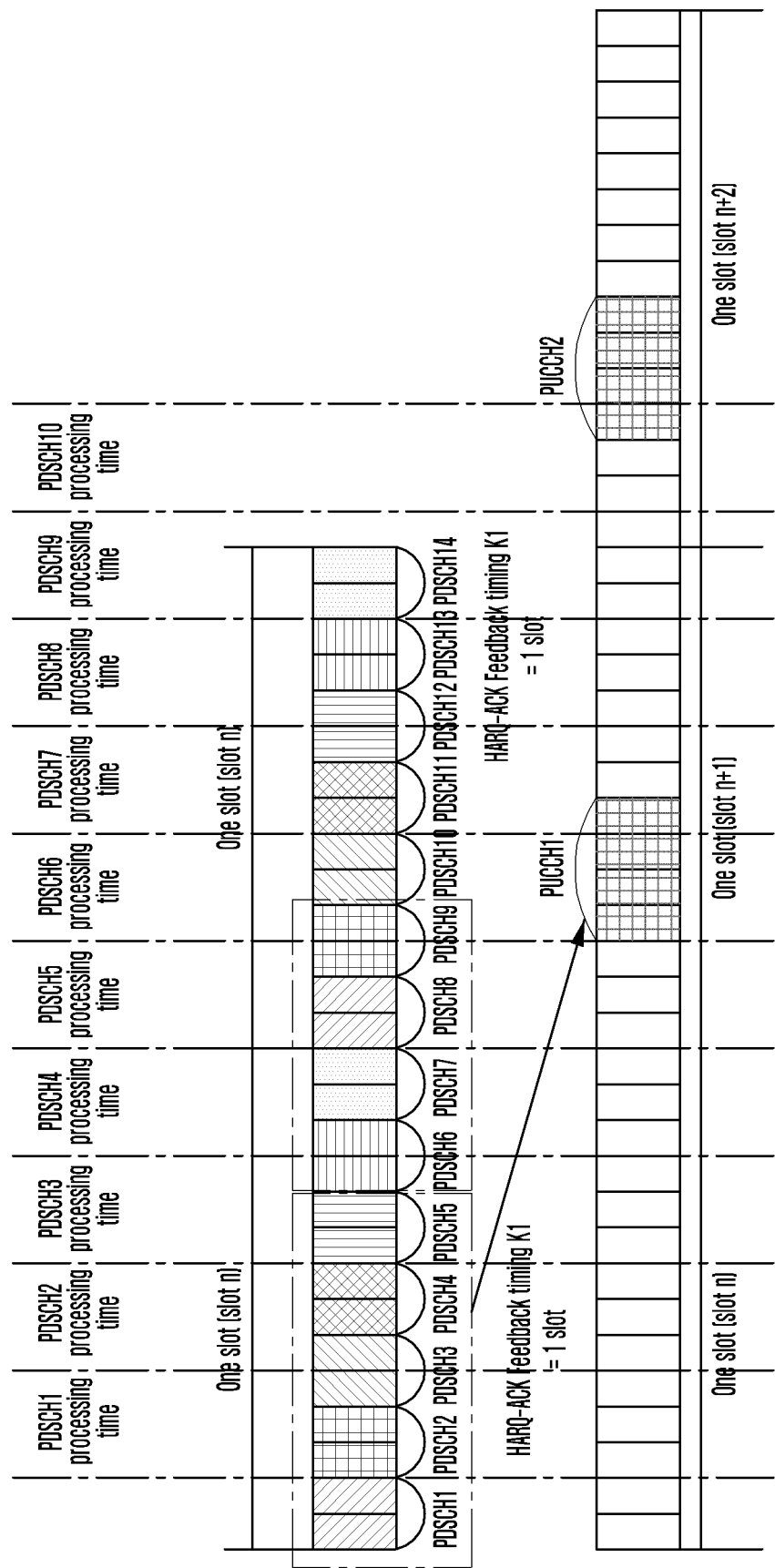
FIG. 4 is a schematic diagram of PUCCH resources for HARQ-ACK feedback according to an embodiment of the present application.

Alternatively, it is assumed that the UE PDSCH processing time is 3 OFDM symbols, and it is assumed that the UE has only one processing branch, that is, only one PDSCH reception can be processed at the same time. As shown in FIG. 4, the base station indicates that the HARQ-ACK timing is 1 slot by the SPS activation signaling, and the start symbol of the PUCCH resource is the 4th OFDM symbol in one slot. For the PDSCH1~5 in one slot n, there is sufficient PDSCH reception processing time to generate HARQ-ACK to be transmitted on PUCCH1 on slot n+1. The resources of PUCCH1 are the first type of PUCCH resources. The time difference of the PDCHs 6~7 to PUCCH1 in slot n is not enough, therefore, the HARQ-ACKs of PDSCHs 6~7 can only be transmitted on PUCCH2 on slot n+2, and HARQ-ACKs of the PDSCHs 8~9 in slot n+1 are also included in PUCCH2. The resources of PUCCH2 are the first type of PUCCH resources. It is not difficult to see that from PDSCH2, the time from the end of each PDSCH to the completing processing the PDSCH is greater than 3 symbols. For example, for PDSCH3, the required time from the end of the last symbol of PDSCH3 to the completing processing the PDSCH3 is PDSCH processing time 3 symbols+2 symbols, wherein the delay of 2 symbols is due to the UE not completing the processing of PDSCH2.

Alternatively, the UE may report the serial/parallel processing capability, or the UE reports the number of downlink carriers that can be simultaneously received, used by the base station to estimate the parallel processing capability of the UE.

If the granularity of the HARQ-ACK timing for determining the HARQ-ACK feedback timing of the PDSCH is less than one slot, for example, a sub-slot of granularity of one or several symbols, and the indicated PUCCH resource is referenced by the boundary of the sub-slot, the HARQ-ACKs of the multiple PDSCHs in one downlink slot may be transmitted on different PUCCH resources.

Figure 5:
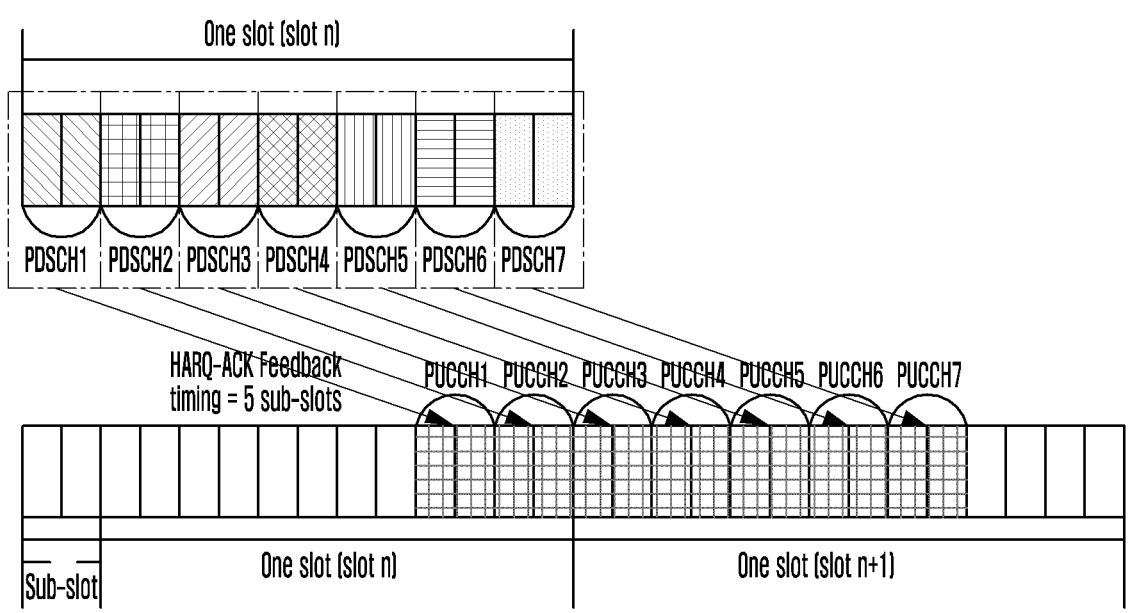
FIG. 5 is a schematic diagram of PUCCH resources for HARQ-ACK feedback according to an embodiment of the present application.

Alternatively, as shown in FIG. 5, the 2 symbols are a sub-slot, and the start symbol of the PUCCH resource indicated by the base station is the first symbol of a sub-slot. Assuming that the UE has multiple branches that process PDSCH reception in parallel, the HARQ-ACKs of the 7 PDSCHs in one slot are transmitted on PUCCHs 1-7, respectively.

Figure 6:
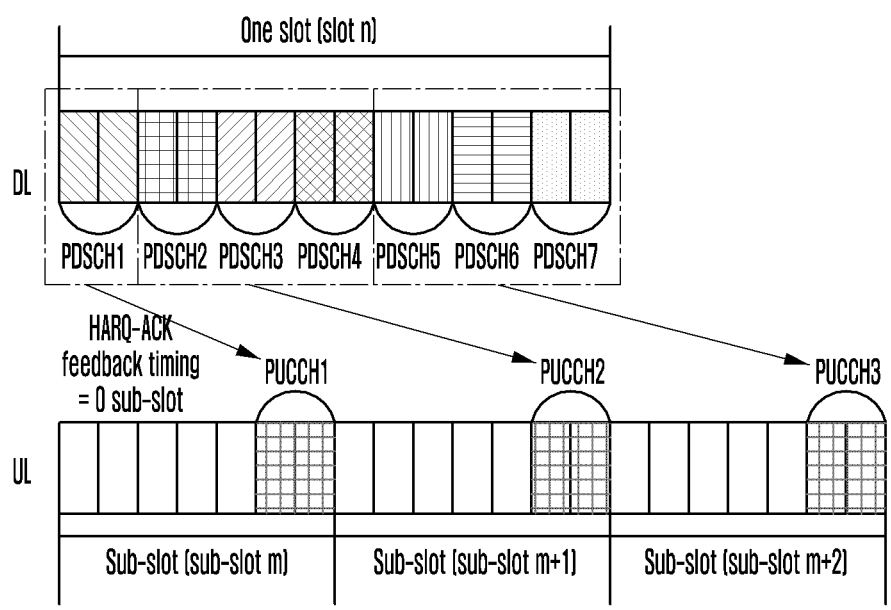
FIG. 6 is a schematic diagram of PUCCH resources for HARQ-ACK feedback according to an embodiment of the present application.

Alternatively, as shown in FIG. 6, the 7 symbols are a sub-slot, and the HARQ-ACK timing indicated by the base station is 0 sub-slot, that is, the sub-slot where the end symbol of the PDSCH is located, and the indicated PUCCH resources are the start symbol of the 6th symbol of a sub-slot. Assuming that the UE PDSCH processing time is calculated as 3 OFDM symbols according to the method in section 5.3 of TS 38.214, the HARQ-ACK of PDSCH1 of slot n can be transmitted on PUCCH1 of sub-slot m, and the HARQ-ACK of PDSCH4 of slot n can be transmitted on PUCCH2 of the sub-slot m+1, and the HARQ-ACKs of the PDSCH2~3 of the slot n can only be transmitted on the PUCCH2 of the sub-slot m+1 due to the limitation of the processing delay. Similarly, the HARQ-ACKs of PDSCH5~7 in slot n can only be transmitted on PUCCH3 of sub-slot m+2 due to the limitation of processing delay.

It is not difficult to see that in the above manner, the HARQ-ACK timing indicated by the base station is applicable to each SPS PDSCH.

Alternatively, the third implementation manner is: the UE determines the PUCCH resource of the first SPS PDSCH by using the HARQ-ACK timing and the PUCCH resource indicated by the base station, and determines the PUCCH resource of each SPS PDSCH by the time offset of the adjacent PUCCH resources indicated by the base station. The first SPS PDSCH is the first SPS PDSCH after the activation signaling (for the second type of SPS PDSCH) or the high layer configuration signaling is valid (for the first type of SPS PDSCH), or the first SPS PDSCH is the first SPS PDSCH in the first slot or sub-slot after activation signaling or high-level configuration signaling takes effect.

Figure 7:
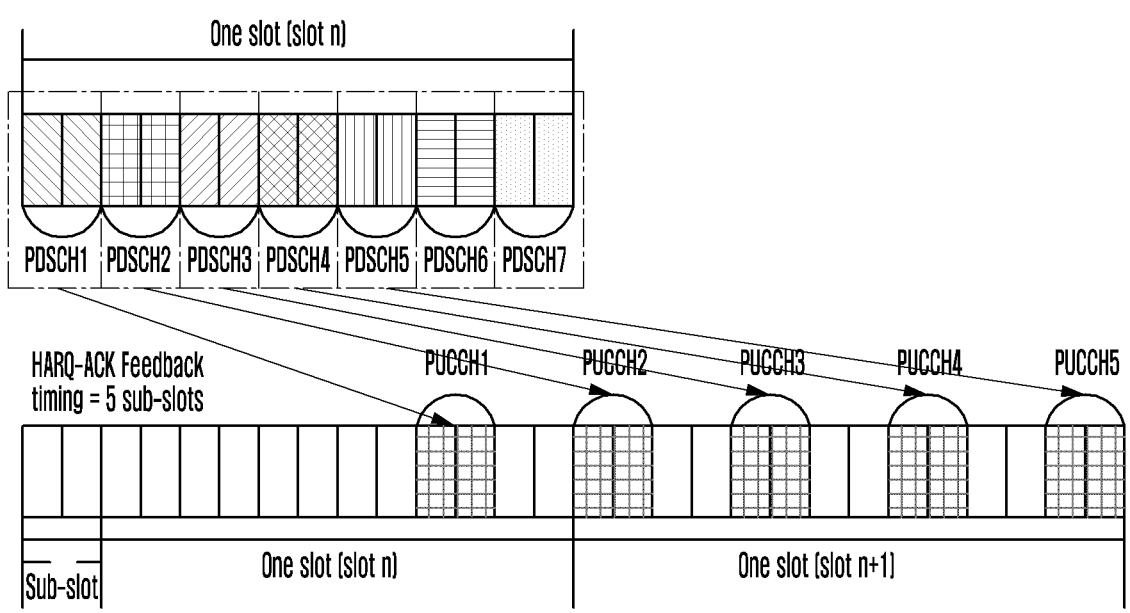
FIG. 7 is a schematic diagram of PUCCH resources for HARQ-ACK feedback according to an embodiment of the present application.

Alternatively, as shown in FIG. 7, it is assumed that the HARQ-ACK timing indicated by the base station is 5 sub-slots, the start symbol of the PUCCH resource is the first symbol of one sub-slot, and the time offset of the PUCCH resources indicating each SPS PDSCH is 2 sub-slots. Assuming that PDSCH1 is the first SPS PDSCH after the base station activates the SPS PDSCH, then PUCCH1 is the 11th symbol of slot n, the PUCCH2 of the HARQ-ACK of PDSCH2 is the sub-slot of the latter two with respect to PUCCH1, and so on.

Alternatively, the time offset of the adjacent PUCCH resources indicated by the base station is used to determine an uplink time unit of the PUCCH, and the PUCCH resource in the uplink time unit is determined by the PUCCH resource semi-persistent configured by the base station. For example, PDSCH1 is the first SPS PDSCH after the base station activates the SPS PDSCH, and the uplink time unit $n_k$ where the PUCCH resource is located is indicated by the HARQ-ACK timing in the activation DCI, and the PUCCH resource is indicated by the PRI in the activation DCI. The PUCCH resource is the first type of PUCCH resource. Then, according to the time offset $N_{off}$ of the adjacent PUCCH resources, it is determined that the uplink time unit of the PUCCH of the second SPS PDSCH is $n_k+N_{off}$, and according to the second type of PUCCH configured by the base station used for HARQ-ACK of the SPS PDSCH, the PUCCH resource in the uplink time unit $n_k+N_{off}$ is determined. The time domain resource indication of the second type of PUCCH resource configured by the high layer signaling includes a PUCCH start symbol and length in an uplink time unit. The frequency domain resource of the second type of PUCCH resource configured by the high layer signaling is the same with or different from the frequency domain resource of the first type of PUCCH resource.

Alternatively, the time offset of the adjacent PUCCH resource indicated by the base station to determine the uplink time unit where the PUCCH is located, the start symbol and the symbol length. For example, PDSCH1 is the first SPS PDSCH after the base station activates the SPS PDSCH, and the uplink time unit $n_k$ where the PUCCH resource is located is indicated by the HARQ-ACK timing in the activation DCI, and the PUCCH resource is determined by the PRI in the active DCI as the 1st~2nd symbols in the uplink time unit $n_k$ located in the 8th~9th symbols in the slot n. The PUCCH resource is the first type of PUCCH resource. The time offset $N_{off}$ of the adjacent PUCCH resource indicated by the base station is 2 symbols, and the start of the PUCCH resource (the second type of PUCCH resource) of the second SPS PDSCH is the 10th symbol of the slot n. If the time domain resource indication of the second type of PUCCH resource configured by the high layer signaling includes the length L of the PUCCH, the PUCCH resource of the second SPS PDSCH occupies the 10th~(10+L−1)-th symbols of the slot n. If the time domain resource indication of the second type of PUCCH resource configured by the high layer signaling does not include the length L of the PUCCH, the length L of the PUCCH of the second type of PUCCH resource is identical to the length L of the PUCCH of the first type of PUCCH resource. The frequency domain resource of the second type of PUCCH resources configured by the high layer signaling is the same with or different from the frequency domain resource of the first type of PUCCH resource.

Alternatively, the PUCCH resource cannot cross the boundary of one uplink time unit, for example, cannot cross the boundary of one slot, or cannot cross the boundary of a sub-slot. If the PUCCH resource determined according to the time offset crosses the boundary, the UE discards the PUCCH resource, does not transmit the HARQ-ACK corresponding to the PUCCH resource, or the UE discards the PUCCH resource, and uses the next PUCCH resource that does not cross the boundary to transmit the HARQ-ACK. Alternatively, the start symbol of this PUCCH resource is delayed backward until the PUCCH resource does not cross the boundary, and the HARQ-ACK is transmitted.

Alternatively, the PUCCH resource may cross the boundary of one uplink time unit.

Alternatively, if at least one symbol of the PUCCH resource is located in the downlink symbol of the semi-persistent configuration, the UE discards the PUCCH resource, does not transmit the HARQ-ACK corresponding to the PUCCH resource, or the UE discards the PUCCH resource, and transmits the HARQ-ACK with the next PUCCH resource that does not include the semi-persistent configured downlink symbol. Alternatively, the start symbol of the PUCCH resource is delayed backward until the PUCCH resource does not include the semi-persistent configured downlink symbol, and the HARQ-ACK is transmitted.

Alternatively, the fourth implementation manner is: the UE determines a PUCCH resource of each SPS PDSCH by using a HARQ-ACK timing, a PUCCH resource, and a PUCCH period indicated by the base station. The PUCCH period of the SPS PDSCH is granular by a slot, a sub-slot, or a symbol.

Alternatively, the PUCCH resource of the first SPS PDSCH is determined by the HARQ-ACK timing and the PUCCH resource indicated by the base station, and the PUCCH resource of the second SPS PDSCH is determined according to the PUCCH resource and the PUCCH period of the first SPS PDSCH, and the PUCCH resources of each SPS PDSCH is determined analogously.

Alternatively, the configured PUCCH time resource length, that is, the number of occupied symbols L, does not exceed the PUCCH period.

When the PUCCH period is granular by a symbol, the third implementation manner may be used as an example of the fourth implementation manner, wherein the time offset of the adjacent PUCCH resources indicated by the base station is equal to the PUCCH period.

Alternatively, the base station configures the PUCCH period $P_2$ to be the same as the SPS PDSCH period $P_1$. Alternatively, the base station configures the PUCCH period $P_2$ to be an integer multiple of the SPS PDSCH period $P_1$.

Alternatively, if the configured PUCCH period is the same as the SPS PDSCH period, only one HARQ-ACK of the PDSCH is included on each PUCCH resource.

Alternatively, if the configured PUCCH period is greater than the SPS PDSCH period, the base station may configure a HARQ-ACK that includes only one PDSCH or a HARQ-ACK that may include multiple PDSCHs on each PUCCH resource.

Alternatively, if the configured PUCCH period is greater than the SPS PDSCH period, the HARQ-ACKs of the multiple PDSCHs may be included on each PUCCH resource.

If one PUCCH may include the HARQ-ACKs of multiple PDSCH, the UE determines on which PUCCH the HARQ-ACK of the SPS PDSCH is transmitted according to the time difference between the start symbol of the PUCCH and the end symbol of the SPS PDSCH. Specifically, it is determined on which PUCCH the HARQ-ACK of the SPS PDSCH is transmitted according to one of the following methods.

(1) If the time difference between the start symbol of the j–1th PUCCH and the end symbol of the SPS PDSCH is less than a predefined threshold, and the time difference between the start symbol of the j-th PUCCH and the end symbol of the SPS PDSCH is greater than or equal to a predefined threshold, then the HARQ-ACK of the SPS PDSCH is transmitted on the j-th PUCCH. The (j–1)-th and j-th PUCCHs are two adjacent PUCCHs determined according to a PUCCH period, and the time domain position of the (j–1)-th PUCCH is earlier than the that of the j-th PUCCH. Alternatively, the predefined threshold is UE PDSCH processing time, or the predefined threshold is configured by the base station, or is predefined according to standard. Specifically, reference may be made to the second implementation manner. Or the predefined threshold is the time difference between the start symbol of the first PUCCH and the end symbol of the first SPS PDSCH. For example, the period of the SPS PDSCH is 2 symbols, and the time resource length L of each SPS PDSCH is 2, occupying 0th~1st symbols, 2nd~3rd symbols, . . . of a downlink slot, and so on. The first SPS PDSCH is the 10th~11th symbols in the downlink slot $n_d$. The HARQ-ACK timing is K1=1, and the PUCCH resource indicated by the PRI is the 6th~7th symbols of an uplink slot. The PUCCH period is 6 symbols, so PUCCH1, 2, 3, 4 . . . is the 6th~7th symbols of the uplink slot $n_d+1$, the 12th~13th symbols of the uplink slot $n_d+1$, the 4th~5th symbols of the uplink slot $n_d+2$, the 10th~11th symbols of the uplink slot $n_d+2$, . . . , in sequence, and so on. The predefined threshold is the time difference between the start symbol of the first PUCCH and the end symbol of the first SPS PDSCH, which is 8 symbols. Then, the HARQ-ACK of the first SPS PDSCH is transmitted on PUCCH1, the HARQ-ACKs of the 2nd~4th SPS PDSCHs are transmitted on PUCCH2, and the HARQ-ACKs of the 5th~7th SPS PDSCHs are transmitted on PUCCH3.

Figure 8A:
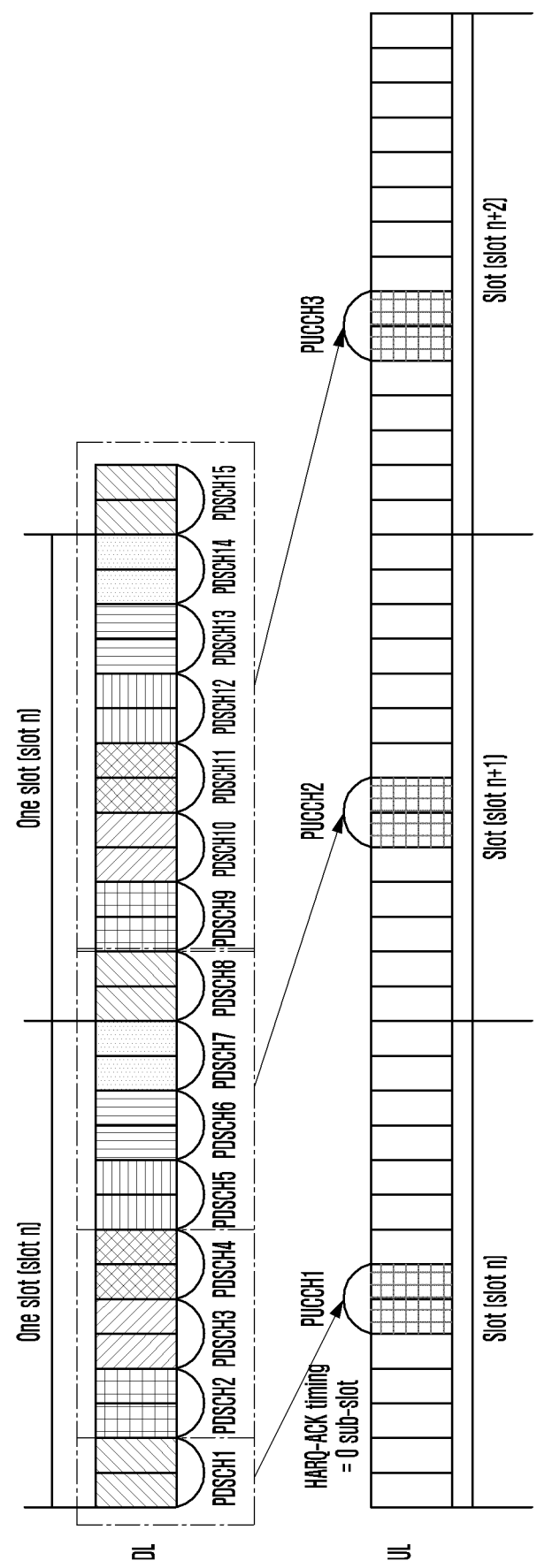
FIG. 8(a) is a schematic diagram of PUCCH resources for HARQ-ACK feedback according to an embodiment of the present application.
Figure 8B:
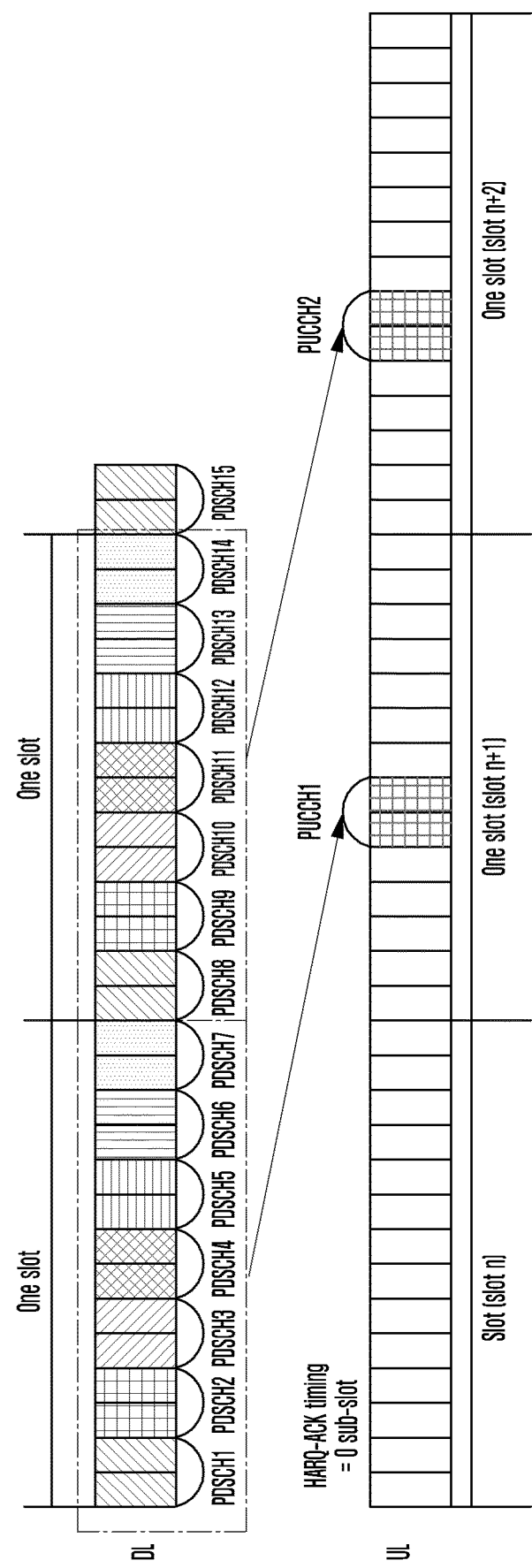
FIG. 8(b) is a schematic diagram of PUCCH resources for HARQ-ACK feedback according to an embodiment of the present application.

(2) If the configured PUCCH period is equal to Y times of the SPS PDSCH period, where Y=P2/P1 is an integer, the HARQ-ACKs of the Y*(i–2)+2~the Y*(i–1)+1 SPS PDSCHs are included in the i-th PUCCH. For example, the period of the SPS PDSCH is P1=2 symbols, and the PUCCH period is P2=14 symbols, and Y=7. Then, the first PUCCH includes the HARQ-ACK of the first SPS PDSCH, the second PUCCH includes the HARQ-ACKs of the 2th~8th SPS PDSCHs, and the third PUCCH includes the HARQ-ACKs of the 9th~15th SPS PDSCHs, as shown in FIG. 8 (a). Alternatively, the i-th PUCCH includes the HARQ-ACKs of the Y*(i–1)+1~Y*i-th SPS PDSCHs. For example, the period of the SPS PDSCH is P1=2 symbols, and the PUCCH period P2 is 14 symbols, and Y=7. Then, the first PUCCH includes the HARQ-ACKs of the 1st~7th SPS PDSCHs, and the second PUCCH includes the HARQ-ACKs of the 8th~14th SPS PDSCHs, as shown in FIG. 8(b). If Y is not an integer, the number of SPS PDSCH corresponding to the HARQ-ACK included in one PUCCH is ceil(Y), or floor(Y), where ceil indicates rounding up and floor indicates rounding down. Assume that Ps is the lowest common multiple of P1, P2, NS1=PS/P1, NS2=PS/P2, then, the total number of SPS PDSCHs corresponding to the HARQ-ACKs included in the NS2 PUCCHs is NS1. Among the NS2 PUCCHs, part of the PUCCHs corresponds to ceil(Y) SPS PDSCHs, and part of PUCCHs corresponds to floor(Y) SPS PDSCHs. For example, the period of the SPS PDSCH is P1=2 symbols, and the PUCCH period P2 is 7 symbols, then Ps=14, NS1=7, NS2=2, and Y=3.5. Then one PUCCH contains HARQ-ACKs of three SPS PDSCHs, and the other PUCCH includes HARQ-ACKs of 4 SPS PDSCHs. For example, the first PUCCH includes the HARQ-ACKs of the 1st~3rd SPS PDSCHs, and the second PUCCH includes the HARQ-ACKs of the 4th~7th SPS PDSCHs. A special implementation manner, the first PUCCH includes only the HARQ-ACK of the first SPS PDSCH, and each PUCCH includes the HARQ-ACKs of the ceil (Y) or the floor (Y) SPS PDSCH respectively from the second PUCCH. For example, the first PUCCH includes the first SPS PDSCH, the second PUCCH includes the HARQ-ACKs of the 2nd~4th SPS PDSCHs, and the third PUCCH includes the HARQ-ACKs of the 5th~8th SPS PDSCHs.

Alternatively, the first PUCCH resource which is the second type is determined according to the first type of PUCCH resource, the PUCCH period indicated by the base station, and the start symbol of the second type of PUCCH resource semi-persistent configured by the base station, and the subsequent second type of PUCCH resources are determined according to the PUCCH period indicated by the base station. The time domain resource indication of the second type of PUCCH resource configured by the high layer signaling includes start symbol and length of PUCCH in an uplink time unit. The frequency domain resource of the second type of PUCCH resource configured by the high layer signaling is the same with or different from the frequency domain resource of the first type of PUCCH resource. The time difference between the first type of PUCCH resource and the first PUCCH resource which is second type is not less than the PUCCH period. For example, PDSCH1 is the first SPS PDSCH after the base station activates the SPS PDSCH, and the uplink slot $n_k$ where the PUCCH resource is located is indicated by the HARQ-ACK timing in the activation DCI, and the PUCCH resource is indicated by the PRI in the activation DCI as the 6th~7th symbols in the uplink slot $n_k$. The PUCCH resource is a first type of PUCCH resource. The PUCCH period is 6 symbols. The time resource of the second type of PUCCH resource configured by the base station includes a start symbol and length, where the start symbol of the PUCCH resource is the 0th symbol in an uplink slot, and the length L is 4 symbols. Then, start symbol of the PUCCH resource is calculated as the 12th symbol in the slot $n_k$, according to the first type of PUCCH resource which are the 6th~7th symbols in the uplink slot $n_k$ and the PUCCH period with 6 symbols. Since the start symbol of time resource of the second type of PUCCH resource configured by the base station is the 0th symbol, the start symbol of time resource of the first PUCCH resource which is second type is the 0th symbol in the slot $n_k+1$, and the length is 4. The second set of PUCCH resources which is second type is determined according to the first PUCCH resource which is second type and the PUCCH period, which is the 6th~9th symbols in the slot $n_k+1$, and so on.

Alternatively, the second type of PUCCH resource is determined according to at least the first type of PUCCH resource and the PUCCH period indicated by the base station. The start symbol of the first PUCCH resource which is second type is determined according to start symbol of the first type of PUCCH resource and the PUCCH period. And determining a start symbol of the subsequent second type of PUCCH resource according to the start symbol of the first PUCCH resource which is second type and the PUCCH period. If the time domain resource indication of the second type of PUCCH resource configured by the high layer signaling includes the length L of the PUCCH, the time resource of the second type of PUCCH is determined by the start symbol of the second type of PUCCH resource and the configured length L. If the time domain resource indication of the second type of PUCCH resource configured by the high layer signaling does not include the length L of the PUCCH, the length L of the PUCCH of the second type of PUCCH resource is the same with the length L of the PUCCH of the first type of PUCCH resource. The frequency domain resource of the second type of PUCCH resource configured by the high layer signaling is the same with or different from the frequency domain resource of the first type of PUCCH resource. Alternatively, start symbol of the first PUCCH resource which is second type is determined according to the PUCCH period indicated by base station and start symbol offset of the second type of PUCCH resource. And start symbol of the subsequent second type of PUCCH resource is determined according to the start symbol the first PUCCH resource which is second type and the PUCCH period.

Alternatively, in a specific implementation, the base station may configure, according to the system requirements, the PUCCH resource according to any one of the foregoing first manner, the second manner, the third manner, and the fourth manner.

The PUCCH resource is determined according to the number of bits of the HARQ-ACK to be reported, or the number of SPS PDSCH corresponding to the HARQ-ACK to be reported.

In some scenarios, the base station configures multiple SPS PDSCH configurations for the UE, and each SPS PDSCH configuration includes one or a set of PUCCH resources for the HARQ-ACK feedback of the SPS PDSCH. Since the time characteristics of the respective SPS PDSCH configurations may be different, such as the period and/or time offset, and the like, in some uplink time units, only one PUCCH resource of the HARQ-ACK of the SPS PDSCH configuration may be included, and in other uplink time units, the PUCCH resource of the HARQ-ACKs of multiple SPS PDSCH configurations may be included.

In other scenarios, one SPS PDSCH configuration, which is configured by the base station for the UE, includes multiple HARQ processes. The HARQ-ACKs of multiple HARQ-ACK processes may be transmitted on the PUCCH resources in the same uplink time unit.

In the above scenario, HARQ-ACKs of multiple SPS PDSCHs may need be transmitted in the same uplink time unit.

Alternatively, (1) the base station may configure multiple PUCCH resources for the UE, where the maximum number of HARQ-ACK bits that can be supported by each PUCCH resource is different. For example, the first PUCCH resource (referred to as PUCCH resource A) supports a maximum of M1 bits of HARQ-ACK, and the second PUCCH resource (PUCCH resource B) supports a number of HARQ-ACK bits greater than M1, less than or equal to M2, where M2>M1.

The UE selects a corresponding PUCCH resource according to the number of HARQ-ACK bits to be reported.

Alternatively, one PUCCH resource may be a single PUCCH resource or a group of PUCCH resources.

Alternatively, if the base station configures multiple SPS PDSCH configurations for the UE, each SPS PDSCH configuration includes one PUCCH resource (PUCCH resource A) for HARQ-ACK feedback.

Alternatively, the base station configures one PUCCH resource A for the UE. The PUCCH resource A is common for different SPS PDSCH configurations or SPS PDSCH HARQ process.

Alternatively, the base station further configures a PUCCH resource B for the UE. The PUCCH resource B is common for different SPS PDSCH configurations.

Alternatively, the base station configures a PUCCH resource A for the UE, which is PUCCH format 1, used for SPS PDSCH HARQ-ACK transmission of up to 2 bits, and configures a PUCCH resource B, which is PUCCH format 4, for SPS PDSCH HARQ-ACK transmission of more than 2 bits. If the number of HARQ-ACK bits of one or more SPS PDSCH configurations does not exceed 2 bits in one uplink time unit, PUCCH resource A is used, otherwise PUCCH resource B is used.

Alternatively, (2) the base station may configure one PUCCH resource A for each SPS PDSCH configuration of the UE, used for transmitting HARQ-ACK of the corresponding SPS PDSCH configuration, and the base station configures one PUCCH resource B for the UE, used for transmitting HARQ-ACKs of multiple SPS PDSCH configurations.

Alternatively, the PUCCH resource A may be one PUCCH resource or a group of PUCCH resources. If it is a group of PUCCH resources, the maximum total number of bits of the HARQ-ACKs supported by different PUCCH resources in a group of PUCCH resources may be different. The UE may select one PUCCH resource in the group of PUCCH resources according to the total number of bits of the HARQ-ACK to be transmitted.

Alternatively, when the base station configures the SPS PDSCH for the UE on multiple serving cells, the configuration ID of the SPS PDSCH may be the same. In the application, these SPS PDSCH configurations are still treated as different SPS PDSCH configurations, unless otherwise specified.

Alternatively, the base station is configured with two SPS PDSCH configurations, one PUCCH resource A1 and PUCCH A2 are configured for configuration 1 and 2 respectively, and the base station is configured with one PUCCH resource B. Then, if there is only one HARQ-ACK to be transmitted of the SPS PDSCH configuration in one uplink time unit, the UE transmits on the PUCCH resource A1 or A2 corresponding to the PDSCH, if there are HARQ-ACKs of SPS PDSCH configuration1 and configuration 2 to be transmitted in one uplink time unit, these HARQ-ACKs are transmitted on the PUCCH resource B.

Alternatively, (3) the base station configures one PUCCH resource A for each SPS PDSCH configuration of the UE, used for transmitting the HARQ-ACK of the corresponding SPS PDSCH configuration, but does not configure the PUCCH resource which may simultaneously transmit HARQ-ACKs of multiple SPS PDSCH configurations.

When the PUCCH resources of the HARQ-ACKs of the multiple SPS PDSCH configurations are included in one uplink time unit (regardless of whether the multiple PUCCH resources are at least partially overlapped), the UE can only transmit one HARQ-ACK of the SPS PDSCH configuration. The UE determines to transmit the HARQ-ACK of the SPS PDSCH configuration with a high priority according to a predefined rule. Alternatively, the predefined rule is a first preset rule, and the predefined rule may be at least one of the following:

determining the priority according to the descending or ascending order of SPS configuration index;

determining the priority according to the descending or ascending order of SPS HARQ process ID;

determining the priority according to the priority of the service type carried by the PDSCH, for example, the priority of the URLLC is higher than the priority of the enhanced mobile broadband (eMBB) service, or the priority of Time Sensitive Networking (TSN) is higher than the priority of Non-Time Sensitive Networking; the priority of the service type may be configured through a higher layer or indicated by a physical layer, for example, indicating the priority of a service type through the SPS activation signaling;

determining the priority according to the descending or ascending order of the serving cell index.

Alternatively, the above priorities may be used in combination. For example, if the service type of the SPS PDSCH configuration on the two different serving cells may have the same priority, the priority is further determined according to the serving cell index.

The HARQ-ACK of the SPS PDSCH with a lower priority cannot be transmitted, which may result in a decrease in the transmission efficiency of the SPS PDSCH. In some scenarios, the base station may obtain the HARQ-ACK of these SPS PDSCHs by retransmitting these SPS PDSCHs that do not transmit HARQ-ACK, or triggering the UE to retransmit the HARQ-ACKs of these SPS PDSCHs. In another implementation manner, it may be specified that if the HARQ-ACK of the SPS PDSCH configuration is included in the uplink time unit of the next HARQ-ACK PUCCH belonging to the SPS PDSCH configuration, or the priority of the SPS PDSCH configuration is the highest, the UE can transmit the HARQ-ACK on the PUCCH resource of this SPS PDSCH configuration. For example, the HARQ-ACK of the SPS PDSCH is in a period of 7 symbols. If the UE does not transmit the HARQ-ACK of the SPS PDSCH1 of the SPS PDSCH configuration1 in the symbol #X, the UE may transmit the HARQ-ACK and HARQ-ACK of SPS PDSCH2 of SPS PDSCH configuration1 on the PUCCH resource on the symbol #X+7. Alternatively, the UE may transmit the HARQ-ACK on the HARQ-ACK PUCCH resource in the next valid uplink time unit which does not transmit the HARQ-ACK resource. For example, if the UE does not transmit the HARQ-ACK of the SPS PDSCH1 of the SPS PDSCH configuration1 in the uplink time unit m, and the PUCCH resource corresponding to the HARQ-ACK is the PUCCH resource 1, the UE may transmit the HARQ-ACK on the PUCCH resource1 in the uplink time unit m+1.

A second aspect of the present application is a method of determining a HARQ-ACK codebook.

The uplink control information composed of all HARQ-ACK bits that are to be transmitted in the same PUCCH is referred to as a HARQ-ACK codebook. If in the same HARQ-ACK codebook, the UE needs to transmit HARQ-ACKs of multiple SPS PDSCHs, for example, the HARQ-ACK timings of multiple SPS PDSCHs point to the same uplink time unit. The UE needs to sort the HARQ-ACK bits of the multiple SPS PDSCHs according to a predefined rule. Alternatively, the predefined rule is a second preset rule, and the predefined rule is at least one of the following rules:

Within one carrier, the HARQ-ACK bits are arranged in ascending order according to the configured HARQ process index (process ID) of the SPS PDSCH.

If the HARQ-ACK of the SPS PDSCH for multiple carriers is to be transmitted in the same PUCCH, HARQ-ACK bit is firstly sorted for multiple SPS PDSCHs within a carrier, and then is sorted in ascending order of carrier index of the multiple carriers.

In some scenarios, the base station configures at most one SPS PDSCH configuration for one carrier, and each SPS PDSCH configuration may include multiple HARQ processes. In other scenarios, the base station may configure multiple SPS PDSCH configurations for one carrier, each SPS PDSCH configuration includes one HARQ process, or multiple HARQ processes, but one HARQ process ID corresponds to only one of the SPS PDSCH configurations at a time. That is, in the same HARQ-ACK codebook, HARQ-ACK of the PDSCH of multiple SPS configurations corresponding to the same HARQ process ID does not appear.

Within one carrier, the HARQ-ACK bits are arranged in ascending order according to the SPS PDSCH configuration index.

If the HARQ-ACK of the SPS PDSCH for multiple carriers is to be transmitted in the same PUCCH, HARQ-ACK bit is firstly sorted for multiple SPS PDSCHs within a carrier, and then is sorted in ascending order of carrier index of the multiple carriers.

Alternatively, in some scenarios, the base station may configure multiple SPS

PDSCH configurations for one carrier, and each SPS PDSCH configuration includes only one HARQ process. Then, according to the SPS PDSCH configuration index, the bit location of the HARQ-ACK bit of the PDSCH of the corresponding SPS PDSCH configuration in the HARQ-ACK codebook can be determined.

Within one carrier, the HARQ-ACK bits are arranged according to the SPS PDSCH configuration index and the configured HARQ process ID within each configuration.

If the HARQ-ACK of the SPS PDSCH for multiple carriers is to be transmitted in the same PUCCH, HARQ-ACK bit is firstly sorted for multiple SPS PDSCHs within a carrier, and then is sorted in ascending order of carrier index of the multiple carriers.

Alternatively, in some scenarios, the base station may configure multiple SPS PDSCH configurations for one carrier, each SPS PDSCH configuration includes one HARQ process, or multiple HARQ processes, and the HARQ process ID of different SPS PDSCH configurations may be the same. Then, the bit location of the HARQ-ACK bit of the corresponding PDSCH in the HARQ-ACK codebook is to be jointly determined by the SPS PDSCH configuration index and the HARQ process ID. For example, the HARQ-ACKs of all SPS PDSCH HARQ processes with the smallest SPS PDSCH configuration index is first arranged (in ascending order of the HARQ process ID), and then the HARQ-ACKs of all SPS PDSCH HARQ processes with the next smallest SPS PDSCH configuration index is arranged, and so on.

Within one carrier, the HARQ-ACK bits are arranged according to the sequential order of the start OFDM symbol of the configured SPS PDSCH.

If the HARQ-ACK of the SPS PDSCH for multiple carriers is to be transmitted in the same PUCCH, HARQ-ACK bit is firstly sorted for multiple SPS PDSCHs within a carrier, and then is sorted in ascending order of carrier index of the multiple carriers.

With this method, it is unnecessary to distinguish which SPS PDSCH configuration or HARQ process ID these SPS PDSCHs belong to, the bit location of the HARQ-ACK bits of the PDSCH in the HARQ-ACK codebook is determined according to the index of the start OFDM symbol of the SPS PDSCH, in ascending order. For example, 7 SPS PDSCH configurations are simultaneously activated by one DCI. These SPS PDSCH configurations are same, the length thereof is 2 symbols, and there is a time offset of 2 symbols in the time dimension. Assuming that the HARQ-ACKs of the 7 SPS PDSCHs in one slot are all transmitted in the same HARQ-ACK codebook, the HARQ-ACK bits of the PDSCHs are arranged in ascending order of the index of the start OFDM symbol of the SPS PDSCHs.

Within one carrier, if there are at least two SPS PDSCHs to be received, and the start OFDM symbol of the PDSCHs are the same but the frequency domain resources of the PDSCHs are different, the HARQ-ACK of the PDSCH may be sorted according to the start symbol of the frequency domain resource, for example, in ascending order of the first subcarrier index of the PDSCH or the first PRB index.

The HARQ-ACK bits are arranged in ascending order of the Downlink Assignment Indication (DAI) values.

Alternatively, in some scenarios, the base station configures a SPS PDSCH with a small period (the time-frequency position of each transmit SPS PDSCH is called an SPS PDSCH transmission occasion), but the base station does not necessarily transmit SPS PDSCH in every SPS PDSCH transmission occasion. The base station may indicate that the resource of the SPS PDSCH is flexible by using a dynamic slot format indicator (SFI), or does not transmit the dynamic SFI to indicate UE that the base station does not transmit the SPS PDSCH. Alternatively, the base station does not need to notify the UE by using other indication information, and the UE determines whether the base station transmits the SPS PDSCH by using blind detection, for example, the UE determines by detecting the reference signal DMRS. Correspondingly, in order to save the cost of the uplink control information UCI, the UE may not transmit the HARQ-ACKs of these SPS PDSCHs. In order to avoid that the HARQ-ACK information actually transmitted by the UE does not match the HARQ-ACK information that the base station expects to receive due to the UE missing detection for the PDSCH or the PDCCH, the base station may simultaneously transmit DAI information in the SPS PDSCH, used for assisting the UE to determine the number of PDSCHs actually transmitted by the base station.

The DAI information can be counter DAI, and/or total DAI. The counter DAI indicates the sequence number of the PDSCH which need to transmit HARQ-ACKs in all PDSCHs in the same HARQ-ACK codebook, and total DAI indicates the total number of all PDSCHs that need to transmit HARQ-ACK in the same HARQ-ACK codebook.

For PDSCH based on PDCCH scheduling, DAI is included in the PDCCH. For the SPS PDSCH, the DAI is to be carried on the resources of the PDSCH. The DAI may be mapped to a part of a specific time-frequency resource in the SPS PDSCH resource, for example, on the symbol adjacent to the DMRS in the SPS PDSCH, the DAI is mapped in a distributed or localized manner in the frequency domain. The DAI and the PDSCH are independently encoded, that is, the decoding of the DAI does not depend on the decoding result of the PDSCH. Alternatively, the DAI may apply repetition coding, polar coding, or Reed-Muller coding.

The UE determines the bit location of the HARQ-ACK bits of the PDSCH in the HARQ-ACK codebook according to the received value of the DAI of the SPS PDSCH, in ascending order.

If both the PDSCH based on the PDCCH scheduling and the SPS PDSCH are in the same HARQ-ACK codebook, all the PDSCHs together encode the DAI according to a predefined rule. Accordingly, the UE determines the bit location of the HARQ-ACK bits of all PDSCHs in the HARQ-ACK codebook according to these DAIs. Alternatively, the DAI in the PDCCH is sorted according to parameters such as the chronological order of the PDCCH monitoring occasion and the carrier index, and the DAI in the PDSCH is sorted according to parameters such as the chronological order of the start symbols of the PDSCH and the carrier index. If the start symbol of the PDSCH is later than the start symbol of the PDCCH monitoring occasion, the value of the DAI in the PDSCH is greater than the value of the DAI in the PDCCH.

Figure 9:
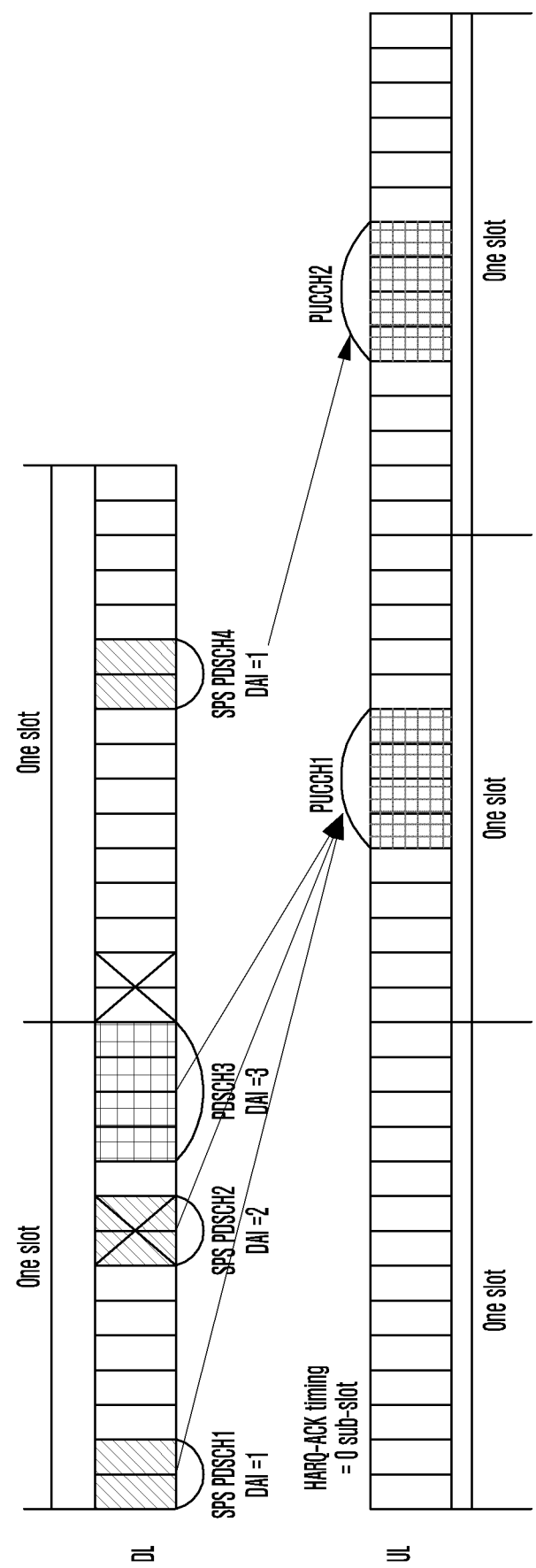
FIG. 9 is a schematic diagram of determining a HARQ-ACK codebook according to an embodiment of the present application.

Alternatively, as shown in FIG. 9, it is assumed that the period of the SPS PDSCH is 7 symbols, and in one slot, the 1st~2nd symbols are SPS PDSCH transmission occasion, and the 8th~9th symbols are another SPS PDSCH transmission occasion. In the downlink slot n, the base station transmits three PDSCHs, where PDSCH1 and PDSCH2 are SPS PDSCH, DAI=1, 2, and PDSCH3 is a PDSCH scheduled by PDCCH, and DAI=3. The UE only receives PDSCH1 and PDSCH3, and misses PDSCH2, but the UE can determine that one PDSCH is missed through the received DAI=1 and DAI=3, so the UE generates a 3 bits HARQ-ACK. In the downlink slot n+1, the base station does not transmit the SPS PDSCH in the first SPS PDSCH transmission occasion, and only transmits the PDSCH4 in the second SPS PDSCH transmission occasion, so DAI=1, after the UE receives the PDSCH4, only 1-bit HARQ-ACK is generated.

Alternatively, if multiple SPS PDSCH configurations are simultaneously released by a single DCI, the HARQ-ACK of the release DCI is transmitted only in the HARQ-ACK location corresponding to one SPS PDSCH of the multiple released SPS PDSCH configurations. One SPS PDSCH may be the nearest SPS PDSCH among the released SPS PDSCH configurations after release DCI, or one SPS PDSCH may be the SPS PDSCH with the earliest start symbol in the reference downlink time unit among the released SPS PDSCH configurations, or one SPS PDSCH may be the SPS PDSCH with the lowest SPS configuration index among the released SPS PDSCH configurations, or one SPS PDSCH may be the SPS PDSCH with the smallest HARQ process index among the released SPS PDSCH configurations.

Alternatively, when determining the HARQ-ACK of the release DCI, it is assumed that the released SPS PDSCH is moved to the downlink time unit where the release DCI locates, and the symbol location of the SPS PDSCH in the downlink time unit is determined according to the start symbol and length of the TDRA indication in the active DCI. For example, the release DCI releases SPS PDSCH configuration1, SPS PDSCH configuration2 and SPS PDSCH configuration3. The release DCI is positioned on the symbols 4~5 of the downlink slot n; the SPS PDSCH configuration1 determined according to the activation DCI is positioned on the symbols 0~6 of the slots n−5, n+5, n+15 . . . ; the SPS PDSCH configuration2 determined according to the activation DCI is positioned on the symbols 5~10 of the slots n−2, n+8, n+18 . . . ; the SPS PDSCH configuration3 determined according to the activation DCI is positioned on the symbols 11~13 of the slots n−2, n+8, n+18 . . . . The PDSCHs of SPS PDSCH configuration 1/2/3 are moved to slot n. If the one SPS PDSCH used to generate the HARQ-ACK of the release DCI is the nearest SPS PDSCH after release DCI according to the released SPS PDSCH configuration, then the HARQ-ACK of the release DCI is determined according to the symbol location of the SPS PDSCH of SPS PDSCH configuration2, due to that the start symbol of the SPS PDSCH configuration1 is earlier than that of the release DCI, and the start symbol of the SPS PDSCH configuration2 is later than that of the release DCI and earlier than that of the SPS PDSCH configuration3. If the one SPS PDSCH is the SPS PDSCH with the earliest start symbol in the reference downlink time unit in the released SPS PDSCH configuration, and the reference downlink time unit is the downlink slot where the release DCI is positioned, then the HARQ-ACK of the release DCI is determined according to the symbol location of the SPS PDSCH of the SPS PDSCH configuration1.

Alternatively, when determining the HARQ-ACK of the release DCI, the downlink time unit where the SPS PDSCH is positioned and the symbol location of the SPS PDSCH are determined according to the K0, the start symbol and the length indicated by the TDRA in the activation DCI. For example, the release DCI releases SPS PDSCH configuration1, SPS PDSCH configuration2 and SPS PDSCH configuration3. The release DCI is positioned on the symbols 4~5 of the downlink slot n; the SPS PDSCH configuration1 determined according to the activation DCI is positioned on the symbols 0~6 of the slots n−5, n+5, n+15 . . . ; the SPS PDSCH configuration2 determined according to the activation DCI is positioned on the symbols 5~10 of the slots n−2, n+8, n+18 . . . ; the SPS PDSCH configuration3 determined according to the activation DCI is positioned on the symbols 11~13 of the slots n−2, n+8, n+18 . . . . If the one SPS PDSCH used to generate the HARQ-ACK of the release DCI is the nearest in the released SPS PDSCH configuration after release DCI, then the HARQ-ACK of the release DCI is determined according to the symbol location of the SPS PDSCH of SPS PDSCH configuration1, due to that the nearest location of SPS PDSCH after release DCI is the slot n+5 of SPS configuration1. Alternatively, the base station cannot schedule other PDSCH transmissions on the time-frequency resource where the SPS PDSCH is located, but the base station can schedule other PDSCH transmissions on the time-frequency resources where the other released SPS PDSCHs are located, thereby reducing the limitation to the PDSCH scheduling. For example, according to one implementation, DCI is deactivated.

When determining the location of HARQ-ACK, if there are multiple of SPS PDSCH locations for one SPS PDSCH configuration in one downlink slot or sub-slot, then the feedback is performed by selecting the HARQ-ACK location corresponding to the SPS PDSCH with the earliest start symbol in this slot or sub-slot according to the above rules.

Alternatively, the base station should avoid that the location of the SPS PDSCH corresponding to the HARQ-ACK of the release DCI is overlapped with the HARQ-ACK location corresponding to the location of active SPS PDSCH. Alternatively, if multiple SPS PDSCH configurations are simultaneously released by a single DCI, the HARQ-ACK feedback of the release DCI is determined according to the HARQ-ACK timing and PUCCH resource indicated in the release DCI. For example, the release DCI includes an index of each SPS PDSCH configuration that can be released, a HARQ-ACK timing, and a PUCCH resource indication bit field.

For one PUCCH, if the HARQ-ACK codebook of the PUCCH contains only the HARQ-ACK of the SPS PDSCH, for example, the UE fails to detect that any HARQ-ACK of the schedule-based PDSCH belongs to the HARQ-ACK codebook, and the UE fails to successfully detect any SPS PDSCH that belongs to the HARQ-ACK codebook, the UE may discard transmitting the PUCCH.

Alternatively, in some scenarios, the base station configures a code rate r for the UE to ensure reception performance of the HARQ-ACK. If transmitting X bits HARQ-ACK on the selected PUCCH resource results the code rate of the HARQ-ACK greater than the configured code rate r, the UE needs to discard the HARQ-ACK bit with low priority according to a predefined rule, so that the code rate of the actually transmitted HARQ-ACK is nearest to r and does not exceed r.

The predefined rules can be at least one of the following:
determining the priority according to the descending or ascending order of SPS configuration index;
determining the priority according to the descending or ascending order of SPS HARQ process ID;
determining the priority according to the priority of the service type carried by the PDSCH, for example, the priority of the URLLC is higher than the priority of the eMBB service, or the priority of TSN is higher than the priority of Non-TSN. The priority of the service type may be configured through a higher layer or indicated by a physical layer, for example, indicating the priority of a service type through the SPS activation signaling.
determining the priority according to the descending or ascending order of the serving cell index.

Alternatively, in another implementation manner, if transmitting X bits HARQ-ACK on the selected PUCCH resource results the code rate of the HARQ-ACK greater than the configured code rate r, the HARQ-ACK bit can be compressed such that the bit rate of the HARQ-ACK does not exceed the code rate r. For example, a Bundling operation is performed on a HARQ-ACK of a PDSCH with low priority.

Alternatively, if the UE is configured with at least two codebooks, for example, one codebook includes HARQ-ACK feedback of the eMBB service, and another codebook includes HARQ-ACK feedback of the URLLC service, and when HARQ-ACK PUCCH resources of multiple SPS PDSCHs corresponding to different codebooks overlap in time domain, the UE shall abandon the HARQ-ACK bits corresponding to the codebook with the lower priority according to the predefined rule, and only transmit the HARQ-ACK bits corresponding to the codebook with the higher priority, or the UE transmits the HARQ-ACK of the SPS PDSCH of the plurality of codebooks at the same time. The HARQ-ACK codebook for the PDSCH based on the PDCCH scheduling is determined according to the scheduled DCI. For example, the HARQ-ACK codebook corresponding to the DCI is determined according to at least one of the DCI format, the size, the scrambling code, a specific bit field in the DCI, or a control channel resource in which the DCI is located. Alternatively, if a single DCI format can indicate a different HARQ-ACK codebook, for example, different HARQ-ACK codebook are determined according to 1-bit information in the DCI or according to the PDCCH CRC scrambled RNTI, the size of the DCI format is determined based on the maximum size of the DCI corresponding to the two HARQ-ACK codebooks. For example, the base station configures two HARQ-ACK codebooks for the UE, wherein one codebook is configured with a dynamic codebook and the other one is configured with a semi-static codebook, and the base station can indicate the HARQ-ACK codebook index by using 1-bit information of the DCI 1_1. Since the dynamic codebook requires DAI bits and the semi-static codebook does not require DAI bits, the DCI size for the dynamic codebook is larger than the one of the semi-static codebook. Accordingly, the size of this DCI 1_1 is determined according to the DCI size of the dynamic codebook. According to one implementation, the size of each bit field and order of each bit field in the DCI 1_1 are determined according to the DCI of the dynamic codebook. When the DCI 1_1 indicates the semi-static codebook, the bit field that is not needed for the semi-static codebook is set to be a predetermined value. According to another implementation, the size of each bit field and order of each bit field in the DCI 1_1 are determined according to the DCI corresponding to the indicated codebook, and the padding bits are added after the end of all the bit fields, so that the size of DCI 1_1 is consistent with a DCI size required for dynamic codebook.

Alternatively, the HARQ-ACK codebook information of a SPS PDSCH configuration is configured for the SPS PDSCH configuration. According to one implementation, in the configuration information, HARQ-ACK codebook index of this SPS PDSCH configuration is indicated. For example, the index of the HARQ-ACK codebook is 0 or 1, which can correspond to different service types. Different HARQ-ACK codebook indexes may correspond to different DCI formats, or scrambling codes, or different values of specific bit fields in the DCI. For example, the HARQ-ACK codebook index of the eMBB service type is 0, and the DCI format 1_0 or 1_1 corresponds to the HARQ-ACK codebook whose index is 0, the HARQ-ACK codebook index of the URLLC service type is 1, and the DCI format X corresponds to the HARQ-ACK codebook whose index is 1. The DCI format X is different from the DCI format 1_0/1_1. According to another implementation manner, in the configuration information, the HARQ-ACK codebook indicating this SPS PDSCH configuration corresponds to a specific DCI format. For example, it is specified that the DCI format 1_0 or 1_1 corresponds to one HARQ-ACK codebook, and the DCI format X corresponds to another HARQ-ACK codebook. In the configuration information, the HARQ-ACK codebook information can be determined according to which DCI format corresponds to the HARQ-ACK codebook indicating this SPS PDSCH configuration. Alternatively, for one SPS PDSCH configuration, the base station shall activate or release the SPS PDSCH configuration through the DCI corresponding to the SPS PDSCH configuration codebook. Alternatively, when the base station schedules the SPS PDSCH retransmission, it is required to apply the DCI scheduled retransmission corresponding to the codebook corresponding to the SPS PDSCH. For example, the activation DCI format of the eMBB service type is DCI 1_0, and the activation DCI format of the URLLC service type is X. If the HARQ-ACK codebook of the SPS PDSCH configuration configured by the base station is the same as the codebook corresponding to DCI X, the base station shall activate the SPS PDSCH configuration by DCI X or DCI format with same type as DCI X.

Alternatively, the HARQ-ACK codebook of the SPS PDSCH configuration is indicated when the configuration is activated/released. For example, the HARQ-ACK codebook of the activated/released SPS PDSCH is indicated by a corresponding DCI format, or RNTI, or a dedicated bit indication in activation DCI format.

Alternatively, when the base station schedules the SPS PDSCH retransmission, the HARQ-ACK codebook of the SPS PDSCH is determined according to the DCI that schedules the SPS PDSCH retransmission.

In an uplink time unit, when there are both the HARQ-ACK of the SPS PDSCH and the HARQ-ACK based on the PDCCH scheduling, the UE may need to transmit the two HARQ-ACKs in one HARQ-ACK codebook. The two HARQ-ACKs are transmitted together in the prior art, and it is assumed that the UE determines the value of the HARQ-ACK according to the decoding result of these PDSCHs, that is, the UE has enough time to process all PDSCHs. In a new scenario, there may be multiple PUSCH resources of the HARQ-ACK of the SPS PDSCH in one uplink time unit, and it is difficult to guarantee that the UE can finish processing all these SPS PDSCHs before the start of any one of the symbols of the uplink time unit (based on the PUCCH resource of the HARQ-ACK of the scheduled PDSCH may start from any symbol). In an implementation manner, when the base station indicates the PUCCH resource of the HARQ-ACK of schedule-based the PDSCH, the base station ensures that the UE has enough time to generate all the HARQ-ACKs that are transmitted on the PUCCH resource, including the HARQ-ACK of schedule-based the PDSCH and the HARQ-ACK of SPS PDSCH. Wherein, the HARQ-ACK bits of the SPS PDSCH are determined according to the method described above in the present invention. In another implementation manner, which HARQ-ACK of the SPS PDSCH and HARQ-ACK of the schedule-based PDSCH can be transmitted together and what is the value of HARQ-ACK is determined according to the method described below.

Specifically, which HARQ-ACK of the SPS PDSCH is transmitted together with the HARQ-ACK of the schedule-based PDSCH and the value of the HARQ-ACK are determined according to at least one of the following manners.

(1) transmitting the HARQ-ACK of all SPS PDSCHs in this uplink time unit together with the HARQ-ACK of schedule-based PDSCH, wherein if the time difference between the end symbol of an SPS PDSCH and a start symbol of a PUCCHs for transmitting these HARQ-ACKs is greater than or equal to a predefined threshold, the UE determines the value of the HARQ-ACK according to the decoding result of the SPS PDSCH, if the time difference between the end symbol of an SPS PDSCH and a start symbol of a PUCCHs for transmitting these HARQ-ACKs is less than a predefined threshold, the UE transmits a NACK, or the value of the HARQ-ACK is determined by the UE. For example, if the UE completes the demodulation of the SPS PDSCH, the UE determines the value of the HARQ-ACK according to the decoding result of the SPS PDSCH, and otherwise transmits the NACK.

(2) transmitting the HARQ-ACK of all SPS PDSCHs in this uplink time unit together with the HARQ-ACK of schedule-based PDSCH, wherein if the start of the PUCCH resource of the HARQ-ACK of one SPS PDSCH is no later than the start symbol of the PUCCHs for transmitting these HARQ-ACKs, the UE determines the value of the HARQ-ACK according to the decoding result of the SPS PDSCH, otherwise the UE transmits a NACK, or the value of the HARQ-ACK is determined by the UE.

(3) If the time difference between the end symbol of the SPS PDSCH and the start symbol of the PUCCHs for transmitting these HARQ-ACKs is greater than or equal to a predefined threshold, the HARQ-ACK of the SPS PDSCH and the HARQ-ACK of schedule-based PDSCH are transmitted together, and the UE determines the value of the HARQ-ACK according to the decoding result of the SPS PDSCH, otherwise the HARQ-ACK of the SPS PDSCH cannot be transmitted together.

(4) If the start symbol of the PUCCH of the HARQ-ACK of one SPS PDSCH is not later than the start symbol of the PUCCHs for transmitting these HARQ-ACKs, the HARQ-ACK of the SPS PDSCH and the HARQ-ACK of schedule-based PDSCH are transmitted together, and the UE determines the value of the HARQ-ACK according to the decoding result of the SPS PDSCH, otherwise the HARQ-ACK of the SPS PDSCH cannot be transmitted together.

(5) If the PUCCH resource of the HARQ-ACK of one SPS PDSCH overlaps with the HARQ-ACK PUCCH of the plurality of schedule-based PDSCHs in time domain, the HARQ-ACK of the SPS PDSCH is transmitted by selecting the HARQ-ACK PUCCH resource of the schedule-based PDSCH that is the earliest in time domain and satisfying the HARQ-ACK processing delay.

Alternatively, when the PUCCH resource of the HARQ-ACK of the SPS PDSCH overlaps with the PUCCH of the HARQ-ACK of schedule-based PDSCH in time domain, according to the method described above, the SPS PDSCH which transmits the HARQ-ACK together with the HARQ-ACK of schedule-based PDSCH may be selected in the SPS PDSCH and the values of these HARQ-ACKs are determined.

Alternatively, if the UE is configured with at least two codebooks, for example, one codebook includes HARQ-ACK feedback of the eMBB service, and another codebook includes HARQ-ACK feedback of the URLLC service, and when the HARQ-ACK PUCCH resource of the SPS PDSCH overlaps with the HARQ-ACK PUCCH of the schedule-based PDSCH in time domain, it may be determined how to transmit the HARQ-ACK of the SPS PDSCH and/or the HARQ-ACK of the schedule-based PDSCH according to the third preset rule.

Alternatively, the third preset rule includes at least one of the followings:

If the codebook of the HARQ-ACK of the schedule-based PDSCH is the same with the codebook of the HARQ-ACK of the SPS PDSCH, and the HARQ-ACK processing delay requirement is satisfied, the two types of HARQ-ACKs may be transmitted together by a single codebook. If the codebook of the HARQ-ACK of the schedule-based PDSCH is the same with the codebook of the HARQ-ACK of the SPS PDSCH, and there are multiple PUCCHs of the HARQ-ACKs of the PDSCHs, the HARQ-ACK of the schedule-based PDSCH and the HARQ-ACK of the SPS PDSCH are transmitted by selecting the HARQ-ACK PUCCH resource of the schedule-based PDSCH that is the earliest in time domain and satisfying the HARQ-ACK processing delay;

If the codebook of the HARQ-ACK of the schedule-based PDSCH is different from the codebook of the HARQ-ACK of the SPS PDSCH, only the HARQ-ACK of the codebook with a higher priority is transmitted;

If the codebook of the HARQ-ACK of the schedule-based PDSCH is different from the codebook of the HARQ-ACK of the SPS PDSCH, once the UE allows, the two types of HARQ-ACKs are respectively transmitted through different HARQ-ACK codebooks;

If the codebook of the HARQ-ACK of the schedule-based PDSCH is different from the codebook of the HARQ-ACK of the SPS PDSCH, the two types of HARQ-ACKs may be transmitted together through the PUCCH of the schedule-based PDSCH;

If the codebook of the HARQ-ACK of the schedule-based PDSCH is different from the codebook of the HARQ-ACK of the SPS PDSCH, and the codebook of the HARQ-ACK of the SPS PDSCH has a lower priority, only the HARQ-ACK of the codebook with a higher priority is transmitted.

Alternatively, if two different types of HARQ-ACKs are transmitted by a single PUCCH, two different types of HARQ-ACKs respectively determine the codebook according to respective codebook parameters, for example, determining the number of bits of the transmitted HARQ-ACK according to respective coding rates, and transmitting the two codebooks by cascading them together, or two different types of HARQ-ACKs are transmitted together according to the codebook parameter of the highest priority codebook, for example, determining the number of PRBs for the PUCCH according to the maximum coding rate r.

Alternatively, the HARQ-ACK codebook of a SPS PDSCH configuration is configured for the SPS PDSCH configuration.

Alternatively, the HARQ-ACK codebook of the SPS PDSCH configuration is indicated when the configuration is activated/released. For example, the HARQ-ACK codebook of the activated/released SPS PDSCH is indicated by a different DCI format, or RNTI, or a explicit bit indication in activation DCI.

Alternatively, if multiple SPS PDSCH configurations are simultaneously released by a single DCI, the released SPS PDSCH configuration must satisfy that the HARQ-ACK codebooks of these SPS PDSCH configurations are the same. The codebook for the HARQ-ACK of the release DCI is determined according to the codebook of the HARQ-ACK of these SPS PDSCHs. According to the foregoing methods of the present disclose, the HARQ-ACK bit location of the release DCI in the selected HARQ-ACK codebook may be determined according to one SPS PDSCH of the released SPS PDSCH configurations. Preferably, the HARQ-ACK codebook of the release DCI is determined according to the release DCI information, for example, the HARQ-ACK codebook of the HARQ-ACK of the release DCI is determined according to the DCI format or size of the release DCI, or the RNTI, or the explicit bit indication.

Alternatively, if multiple SPS PDSCH configurations are simultaneously released by a single DCI, the HARQ-ACK codebooks corresponding to the released SPS PDSCH configurations may be the same or different. According to predefined rules, one HARQ-ACK codebook is selected for HARQ-ACK of this DCI. According to the foregoing methods of the present disclose, the HARQ-ACK bit location of the release DCI in the selected HARQ-ACK codebook may be determined according to one SPS PDSCH of the released SPS PDSCH configurations. The predefined rules for selecting a HARQ-ACK codebook are at least one of the following:

(1) The HARQ-ACK codebook for the release DCI is determined according to the HARQ-ACK codebook with highest priority corresponding to the released SPS PDSCHs.

(2) The HARQ-ACK codebook for the release DCI is determined according to the HARQ-ACK codebook with lowest priority corresponding to the released SPS PDSCHs.

(3) The HARQ-ACK codebook of the release DCI is determined according to the release DCI information. For example, the HARQ-ACK codebook of the HARQ-ACK of the release DCI is determined according to the DCI format or size of the release DCI, or the RNTI, the explicit bit indication, or the CORESET where the release DCI is located.

(4) The HARQ-ACK codebook of the release DCI is determined according to the HARQ-ACK codebook corresponding to the SPS PDSCH configuration with the highest or lowest index for released SPS PDSCH configurations.

(5) The HARQ-ACK codebook for the release DCI is determined according to the HARQ-ACK codebook corresponding to the SPS PDSCH configuration with the earliest temporal location in the released SPS PDSCH configurations.

For example, in one uplink slot, there are one PUCCH1 of the HARQ-ACK of the eMBB, where the HARQ-ACK codebook of the PUCCH1 is the codebook A, and the PUCCH2 of the HARQ-ACK of the URLLC, where the HARQ-ACK codebook of the PUCCH2 is the codebook B, and also one PUCCH3 of the SPS PDSCH, which overlaps both PUCCH1 and PUCCH2. If the codebook of PUCCH3 is codebook A, the HARQ-ACK of the SPS PDSCH may be transmitted in PUCCH1.

For another example, in one uplink slot, there are two PUCCHs of HARQ-ACK of URLLC, which are all codebook B, but are located in different uplink sub-slots. And there is a PUCCH3 of the SPS PDSCH, which overlaps with both two PUCCHs. If the codebook of PUCCH3 is codebook A and the priority of codebook A is lower than codebook B, the HARQ-ACK of the SPS PDSCH is not transmitted.

If the UE transmits the HARQ-ACK of the SPS PDSCH and the HARQ-ACK of schedule-based PDSCH in one HARQ-ACK codebook, but there is at least one SPS PDSCH, the time resource for which does not belong to any one of the time resource allocation set of the PDSCH (also called a TDRA table) and/or the slot set (i.e., a set of downlink slots determined according to HARQ-ACK timing K1), in the prior art, the method for determining a semi-persistent codebook only depend on the time resource allocation table and/or the slot set of the PDSCH cannot support the HARQ-ACK reporting of these SPS PDSCHs. To solve this problem, the semi-persistent codebook is determined according to the union of the set of SPS PDSCH time resources and the time resource allocation set and the slot set of the PDSCH. An implementation manner: the semi-persistent codebook determines the first M bits of the HARQ-ACK codebook according to the time resource allocation set of the PDSCH, and determines the (M+1)-th to (M+N)-th bits of the codebook according to the SPS PDSCH resource set. Preferably, if the UE works in the carrier aggregation mode, the first M bits of the HARQ-ACK codebook include the HARQ-ACK determined by all configured carriers or the activated carrier according to the time resource allocation set and the slot set of the PDSCH, and the M+1th to (M+N)-th bits include the HARQ-ACK of all configured or activated SPS PDSCHs, the arrangement of HARQ-ACK bits of each SPS PDSCH refers to the second preset rule in the present invention. Preferably, if the UE works in the carrier aggregation mode, the first Mi bits of the HARQ-ACK codebook includes the HARQ-ACK determined by the time resource allocation set and the slot set of the PDSCH of the carrier i, and the (Mi+1)-th to (Mi+Ni)-th bits include the HARQ-ACK of the configured or activated SPS PDSCH of carrier i, the arrangement of HARQ-ACK bits of each SPS PDSCH refers to the second preset rule in the present invention, and the HARQ-ACK of the (Mi+Ni)-th bit of all configured or activated carriers are sequentially connected in a carrier index order. For example, the transmission slot for the HARQ-ACK of the SPS PDSCH is determined according to the K1 configured by the base station or in the activation DCI as well as the semi-static uplink and downlink configuration. It is assumed that the SPS PDSCH ends in slot n, and the uplink slot in which the HARQ-ACK is transmitted is the first available uplink slot that is not earlier than slot n+K1. Taking the semi-static uplink and downlink configuration DDDDUDDDDU as an example, assuming that the SPS PDSCH period is 1 slot and K1 is 2 slots, then the HARQ-ACK of the SPS PDSCH in the 1st, 2nd, and 3th downlink slots (D) are transmitted in the first uplink time slot (U). Assuming that the set of K1 is {1, 2}, then the HARQ-ACK codebook transmitted in the first uplink slot includes the HARQ-ACK corresponding to the PDSCH time resource location in the 3rd and 4th downlink slots D, and includes the HARQ-ACK corresponding to the SPS PDSCH in the 1st and 2nd downlink slots D which do not belong to the set. If the HARQ-ACK transmission slot for the dynamically scheduled PDSCH is also determined according to the K1 in the DCI and the semi-static uplink and downlink configuration, then the HARQ-ACK codebook determines the slot set according to the HARQ-ACK timing K1 and the semi-static uplink and downlink configuration, and the HARQ-ACK location of each PDSCH in the slot set is determined according to the time resource allocation set of the PDSCH. In another implementation manner, the semi-persistent codebook determines all the HARQ-ACK bits of HARQ-ACK codebooks according to the sequence of each time resources in time domain in the union which is the union of the time resource set of the SPS PDSCH and the time resource allocation set of the PDSCH. For example, the time resource allocation set of the PDSCH includes two PDSCH locations, which are symbols #0-#5 and #12-#13, respectively, and the time resource set of the SPS PDSCH is two PDSCH locations, which are symbols #0-#3 and #7-#10. Then, the HARQ-ACK codebook includes HARQ-ACKs of 3 PDSCH locations, respectively corresponding to SPS PDSCH/schedule-based PDSCH of the symbols #0-#3 or #0-#5, SPS PDSCH of #7-#10, and schedule-based PDSCH of #12-#13.

If there are both an HARQ-ACK of the SPS PDSCH and a PUSCH in one uplink time unit, according to the above method, the SPS PDSCHs that transmit HARQ-ACKs in the PUSCH and the values of these HARQ-ACKs are selected in these SPS PDSCHs, and only the "PUCCHs for transmitting these HARQ-ACKs" in the above description are replaced with PUSCHs.

Alternatively, the PUSCH is a PUSCH determined based on a predefined rule. For example, the PUSCH is a schedule-based PUSCH. For another example, the PUSCH is a PUSCH which is configured by a base station and can carry a HARQ-ACK of a specific PDSCH. For another example, the PUSCH is a PUSCH with a higher priority than the HARQ-ACK of the SPS PDSCH.

Similarly, if there are both an HARQ-ACK of the SPS PDSCH and other uplink control information, such as periodic or semi-persistent channel state information CSI, in an uplink time unit, according to the method described above, the SPS PDSCH which transmits the HARQ-ACK in the PUCCH resource of the CSI can be selected from among these SPS PDSCHs and the values of these HARQ-ACKs are determined, and only the "PUCCHs for transmitting these HARQ-ACKs" in the above description is replaced with the PUCCH for transmitting the CSI.

Figure 10A:
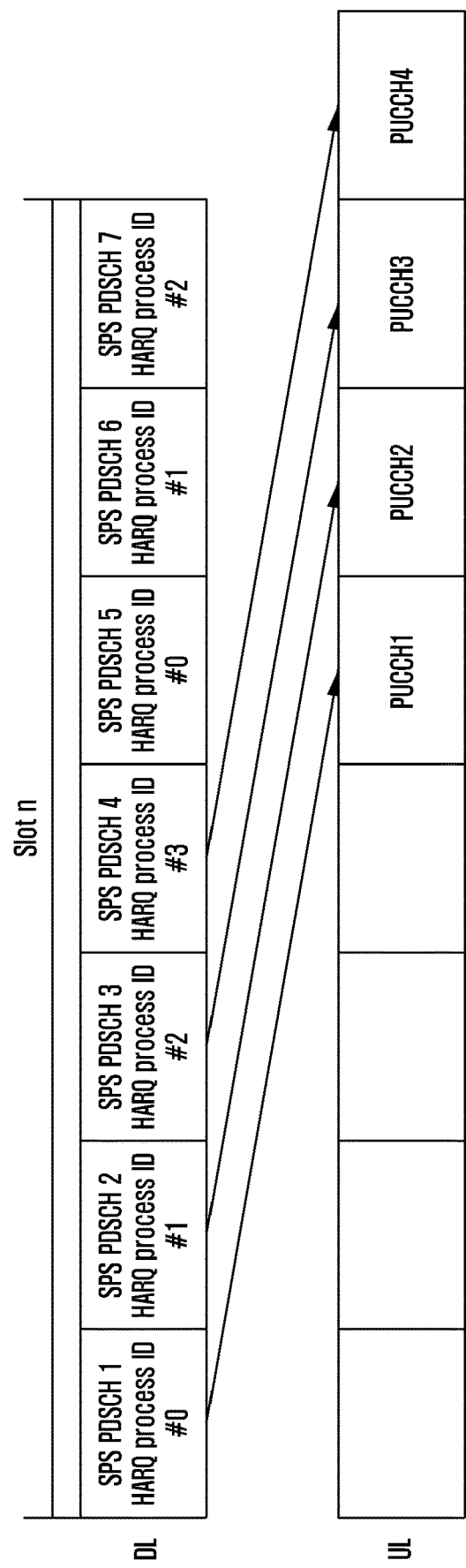
FIG. 10(a) is a schematic diagram of determining a HARQ-ACK codebook according to an embodiment of the present application.

In the third aspect of the present application, when generating the HARQ-ACK of the SPS PDSCH, the UE needs to determine whether the base station transmits the SPS PDSCH, whether the SPS PDSCH transmitted by the base station is a new transport block (TB) or a retransmission, thereby determining the value of the HARQ-ACK, and/or whether to transmit a HARQ-ACK. If the period of the SPS PDSCH is short, the HARQ-ACK of the SPS PDSCH corresponding to a certain HARQ process ID may not be obtained before the SPS PDSCH location of the next same HARQ process ID, and a new method is needed to handle this situation to improve HARQ efficiency. As shown in FIG. 10(a), the total number of HARQs of the SPS PDSCH is 4, the HARQ process IDs are #0 to #3, the period of the SPS PDSCH is 2 symbols, and the PUCCH period resource is also 2 symbols. It is assumed that the first SPS PDSCH is located in the #0~#1 symbols of the slot n, corresponding to the HARQ process ID #0, and the second SPS PDSCH is located in the #2~#3 symbols of the slot n, corresponding to the HARQ process ID #1, the third SPS PDSCH is located in the #4~#5 symbols of the slot n, corresponding to the HARQ process ID #2, and the 4th SPS PDSCH is located in the #6~#7 symbols of the slot n, corresponding to HARQ process ID #3, the fifth SPS PDSCH is located in the #8~#9 symbols of the slot n, corresponding to the HARQ process ID #0, . . . and so on. It is assumed that the first PUCCH resource is located in the #8th symbol of slot n, including the HARQ-ACK of the first SPS PDSCH, and the second PUCCH resource is located in the #10th symbol of slot n, including the HARQ-ACK of the second SPS PDSCH . . . and so on. Then, before the start symbol of the SPS PDSCH5 resource of the HARQ process ID #0, the base station has not received the HARQ-ACK of the SPS PDSCH1 of the HARQ process ID #0. The transmission of the SPS PDSCH at the location of SPS PDSCH5 may be determined according to one of the following ways: (1) The UE assumes that the base station does not transmit the SPS PDSCH at the location of the SPS PDSCH5; (2) the UE assumes that the base station transmits the retransmission of the SPS PDSCH1 at the location of the SPS PDSCH5.

That is, for the location of the SPS PDSCH corresponding to the same HARQ process ID, if the time difference of the PUCCH resource of the HARQ-ACK of the previous SPS PDSCH relative to the resource of the current location of the SPS PDSCH is less than a predefined threshold, for example, the time difference between the end or start symbol of the PUCCH resource of the HARQ-ACK of the previous SPS PDSCH to the start symbol of the current location of SPS PDSCH is less than a predefined threshold, and the transmission of the SPS PDSCH of the current location of the SPS PDSCH may be handled according to (1) or (2). The predefined thresholds can be predefined by standard or configured by the base station. Or, for the location of SPS PDSCH corresponding to the same HARQ process ID, if the time difference of the resource of the previous SPS PDSCH relative to the resource of the current location of the SPS PDSCH is less than a predefined threshold, for example, the time difference between the end or start symbol of the previous SPS PDSCH resource to the start symbol of the current location of the SPS PDSCH is less than a predefined threshold, and the transmission of the SPS PDSCH of the current location of the SPS PDSCH may be handled according to (1) or (2). The predefined thresholds can be predefined by standard or configured by the base station.

Alternatively, if the time difference described above is greater than or equal to a predefined threshold, and the UE does not receive an indication to schedule the previous SPS PDSCH before the start symbol of the current location of the SPS PDSCH, the UE considers the SPS PDSCH received at the current location of the SPS PDSCH is a new transport block TB.

Figure 10B:
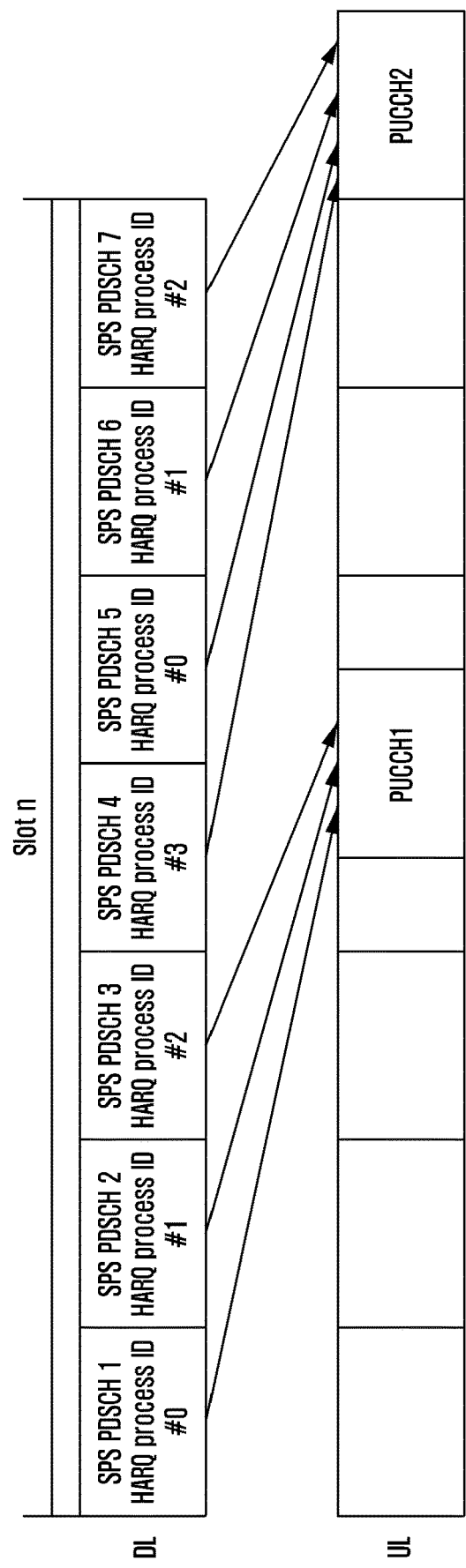
FIG. 10(b) is a schematic diagram of determining a HARQ-ACK codebook according to an embodiment of the present application.

Alternatively, if the time difference described above is greater than or equal to the predefined threshold, and the UE transmits the ACK, does not receive an indication to schedule retransmission of the previous SPS PDSCH before the start symbol of the current location of the SPS PDSCH, then the UE considers that the SPS PDSCH received at the current location of the SPS PDSCH is a new transport block TB; if the UE transmits the NACK and does not receive an indication to schedule retransmission of the previous SPS PDSCH before the start symbol of the current location of the SPS PDSCH, the UE considers that the SPS PDSCH received at the current location of the SPS PDSCH is a retransmission of the previous SPS PDSCH. As shown in FIG. 10(b), if the time difference between the end symbol of the PUCCH resource of the HARQ-ACK of the previous SPS PDSCH and the start symbol of the current location of the SPS PDSCH is less than a predefined threshold of 2 symbols, the UE considers that there is no SPS PDSCH on the current location of SPS PDSCH. If the time difference exceeds 2 symbols, then if the DCI scheduling the previous SPS PDSCH is not received before the start of the current location of the SPS PDSCH, it is considered to be a new TB. Then, the UE considers that the base station does not transmit the SPS PDSCH at the locations of the SPS PDSCH5 and the SPS PDSCH6, and on the SPS PDSCH7, the UE considers that the base station transmits the new TB of the HARQ process ID #2.

Alternatively, if the UE processes according to the method of (1), the UE assumes that the base station does not transmit the SPS PDSCH at the location of a certain SPS PDSCH, and the UE does not report the HARQ-ACK corresponding to the location of the SPS PDSCH.

Alternatively, if the UE processes according to the method of (1), the UE assumes that the base station does not transmit the SPS PDSCH at the location of the SPS PDSCH, and the UE reports the HARQ-ACK corresponding to the location of the SPS PDSCH, and the value of the HARQ-ACK is NACK.

Alternatively, if the UE processes according to the method of (2), the UE reports the HARQ-ACK of the SPS PDSCH.

In order to simplify the system design, the situation that the HARQ-ACK of the previous SPS PDSCH is received by the base station before the next location of the SPS PDSCH of the same HARQ process ID may be avoided. That is, when configuring the SPS PDSCH, the base station should avoid the HARQ-ACK feedback of the previous SPS DSCH in the consecutive SPS PDSCHs between the adjacent two SPS PDSCHs of the same HARQ process ID. Correspondingly, the UE expects that the base station will not configure such SPS PDSCH.

In a fourth aspect of the application, the calculation of the power of the PUCCH that transmits the HARQ-ACK.

Alternatively, (1) the UE determines, according to the activated SPS PDSCH configuration, the number of HARQ-ACK bits used to calculate a PUCCH power including the HARQ-ACK of the SPS PDSCH.

For the first type of SPS PDSCH, the activated SPS PDSCH is configured to receive the SPS PDSCH of the corresponding SPS configuration signaling by the UE. For the second type of SPS PDSCH, the activated SPS PDSCH is configured to receive the SPS PDSCH of the corresponding SPS activation signaling by the UE.

Alternatively, (2) the UE determines, according to the actually received SPS PDSCH, the number of HARQ-ACK bits used to calculate a PUCCH power including the HARQ-ACK of the SPS PDSCH.

Alternatively, the base station activates one SPS PDSCH on a serving cell c, where the period is 2 symbols and one slot includes 7 SPS PDSCHs. It is assumed that the HARQ-ACKs of the 7 SPS PDSCHs correspond to the same PUCCH. The base station actually transmits only 4 SPS PDSCHs in one slot, and the UE actually receives 4 SPS PDSCHs. The UE transmits 7 bits HARQ-ACK on the PUCCH, where the value of the 4 bits HARQ-ACK is determined according to the received decoding result of the SPS PDSCH, and the value of the other 3 bits HARQ-ACK is NACK. According to the method (1), the number of HARQ-ACK bits used to calculate the PUCCH power $N_{SPS,c}=7$, and according to the method (2), the number of HARQ-ACK bits used to calculate the PUCCH power $N_{SPS,c}=4$. Alternatively, this method is applicable to the case where the PUCCH adopts Reed-Muller coding. For example, when the PUCCH payload does not exceed 11 bits, it is determined that the transmission power is beneficial, according to the number of valid HARQ-ACK bits that are actually needed to be transmitted.

Alternatively, the UE determines, according to the SPS PDSCH transmitted by the base station that the UE determines, the number of HARQ-ACK bits used to calculate the PUCCH power including the HARQ-ACK of the SPS PDSCH.

Alternatively, the base station simultaneously transmits the DAI information when transmitting the SPS PDSCHs, and assists UE to determine the number of SPS PDSCHs that the base station actually transmits. The base station activates one SPS PDSCH on a serving cell c, where the period is 2 symbols and one slot includes 7 SPS PDSCHs. It is assumed that the HARQ-ACKs of the 7 SPS PDSCHs correspond to the same PUCCH. The base station actually transmits only 4 SPS PDSCHs in one slot, and the UE actually receives 3 SPS PDSCHs, and the DAIs are 1, 2, and 4, respectively. Then, although the UE receives only 3 SPS PDSCHs, the UE can determine that the base station actually transmits 4 SPS PDSCHs through the received DAI, so the UE misses the third one. Therefore, according to the method (3), the number of HARQ-ACK bits used to calculate a PUCCH power $N_{SPS,c}=4$.

Applying the embodiments of the present application has at least the following beneficial effects:

The efficiency of HARQ-ACK feedback of the SPS PDSCH is improved.

Embodiment 3

Figure 11:
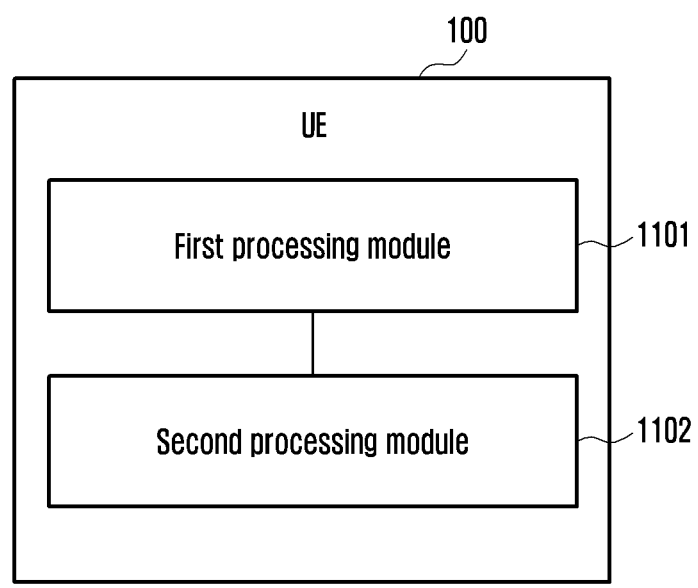
FIG. 11 is a schematic structural diagram of a UE according to an embodiment of the present application.

Based on the above inventive concepts of the first and second embodiments, the embodiment of the present application further provides a UE. The schematic diagram of the structure of the UE is shown in FIG. 11. The UE 110 includes a first processing module 1101 and a second processing module 1102.

The first processing module 1101 is configured to determine, according to the first information, a physical uplink control channel PUCCH resource for the HARQ-ACK feedback, wherein the first information includes at least one of HARQ-ACK feedback timing, the number of bits of the HARQ-ACK of the semi-persistent scheduling physical downlink shared channel SPS PDSCH to be reported, and the number of SPS PDSCH corresponding to the HARQ-ACK to be reported, a PUCCH resource set, and a PUCCH period;

The second processing module 1102 is configured to perform HARQ-ACK feedback according to the PUCCH resource for the HARQ-ACK feedback and the HARQ-ACK codebook.

Alternatively, the first processing module 1101 is configured to determine, according to the HARQ-ACK feedback timing, an uplink time unit in which the HARQ-ACK is located and a PUCCH resource for the HARQ-ACK feedback in the uplink time unit; determine the PUCCH resource for the HARQ-ACK feedback according to the number of bits of the HARQ-ACK of the SPS PDSCH to be reported or the number of SPS PDSCH corresponding to the HARQ-ACK to be reported, and the PUCCH resource set.

Alternatively, the first processing module 1101 is configured to determine, by the HARQ-ACK feedback timing, an uplink time unit in which the HARQ-ACK feedback of each SPS PDSCH is located, and determining a PUCCH resource for the HARQ-ACK feedback in the uplink time unit; determine, by the HARQ-ACK feedback timing and a UE PDSCH processing time requirement, an uplink time unit in which the HARQ-ACK feedback of each SPS PDSCH is located, and determining a PUCCH resource for the HARQ-ACK feedback in the uplink time unit; determine, by the HARQ-ACK feedback timing, a PUCCH resource of a first SPS PDSCH, and determining a PUCCH resource of each SPS PDSCH by a time offset of the adjacent PUCCH resources; determine, by the HARQ-ACK feedback timing, a PUCCH resource of a first SPS PDSCH, and determining a PUCCH resource of each SPS PDSCH by the PUCCH period of the SPS PDSCH.

Alternatively, the first processing module 1101 is configured to transmit the HARQ-ACK of each SPS PDSCH in the PUCCH resource in the same uplink time unit, for each SPS PDSCH located in the downlink time unit corresponding to the same uplink time unit; transmit the HARQ-ACK of the SPS PDSCH that satisfies the UE PDSCH processing time requirement in the PUCCH resource in the same uplink time unit, for each SPS PDSCH located in the downlink time unit corresponding to the same uplink time unit; transmit the HARQ-ACK in the PUCCH resource in the next uplink time unit that satisfies the UE PDSCH processing time requirement, for the SPS PDSCH that does not satisfy the UE PDSCH processing time requirement.

Alternatively, the uplink time unit includes any one of the following:

an uplink slot, an uplink sub-slot, and a time domain resource of the PUCCH.

Alternatively, the first processing module 1101 is configured to: determine the PUCCH resources based on multiple PUCCH resources in the configured PUCCH resource set, in which the maximum number of HARQ-ACK bits that can be supported by each PUCCH resource is different, according to the number of bits of the HARQ-ACK of the SPS PDSCH to be reported or the number of SPS PDSCH corresponding to the HARQ-ACK to be reported; determine the PUCCH resource based on a first PUCCH resource for transmitting HARQ-ACKs of each SPS PDSCH configuration and a second PUCCH resource for transmitting HARQ-ACKs of multiple SPS PDSCH configurations in a configured PUCCH resource set, according to the number of bits of the HARQ-ACK of the SPS PDSCH to be reported or the number of SPS PDSCH corresponding to the HARQ-ACK to be reported; determine the PUCCH resource based on a first set of PUCCH resources for transmitting HARQ-ACKs for each SPS PDSCH configuration in a configured PUCCH resource set, according to the number of bits of the HARQ-ACK to be reported or the number of SPS PDSCH corresponding to the HARQ-ACK to be reported.

Alternatively, the first processing module 1101 is configured to: determine priority of the SPS PDSCH configuration according to a first preset rule, when the configured PUCCH resource set not including the PUCCH resource for simultaneously transmitting the HARQ-ACK for multiple SPS PDSCH configurations, and determine the PUCCH resources by selecting the SPS PDSCH configuration with highest priority.

Alternatively, the first preset rule includes at least one of the following:

As the index of the SPS configuration increases, the priority increases monotonically;

As the index of the SPS HARQ process increases, the priority increases monotonically;

As the priority of the service type carried by the physical downlink shared channel PDSCH increases, the priority increases monotonically;

As the index of the serving cell increases, the priority increases monotonically.

Alternatively, the UE 110 further includes a first determining module.

The first determining module is configured to determine bit location of the HARQ-ACK of the multiple SPS PDSCHs in the HARQ-ACK codebook according to a second preset rule.

Alternatively, the second preset rule includes at least one of the following:

Within one carrier, arranging the HARQ-ACK bits in ascending order according to HARQ process ID of the configured SPS PDSCH;

Within one carrier, arranging the HARQ-ACK bits in ascending order according to the SPS configuration index of the SPS PDSCH;

Within one carrier, arranging the HARQ-ACK bits according to the index of the SPS configuration of the SPS PDSCH and the index of configured HARQ process within each configuration;

Within one carrier, arranging the HARQ-ACK bits according to the chronological order of start orthogonal frequency division multiplexing OFDM symbol of the configured SPS PDSCH;

Arranging the HARQ-ACK bits according to ascending order of value of downlink allocation indication DAI.

Alternatively, the UE 110 further includes a second determining module.

The second determining module is configured to acquire second information; determining the number of HARQ-ACK bits according to the second information, and determining a PUCCH power according to the number of HARQ-ACK bits;

Performing HARQ-ACK feedback includes performing HARQ-ACK feedback using PUCCH power.

Alternatively, the second information includes any one of the following:

The activated SPS PDSCH, the actually received SPS PDSCH, and the SPS PDSCH transmitted by the base station assumed by the UE.

Applying the embodiments of the present application has at least the following beneficial effects:

the HARQ-ACK feedback efficiency of the SPS PDSCH is improved.

For the content that is not described in detail in the UE provided by the embodiment, refer to the method for the HARQ-ACK feedback of the semi-persistent scheduling data, and the beneficial effects that the UE can provide are the same as the method for the HARQ-ACK feedback of the semi-persistent scheduling data, and are not described herein.

Embodiment 4

Figure 12:
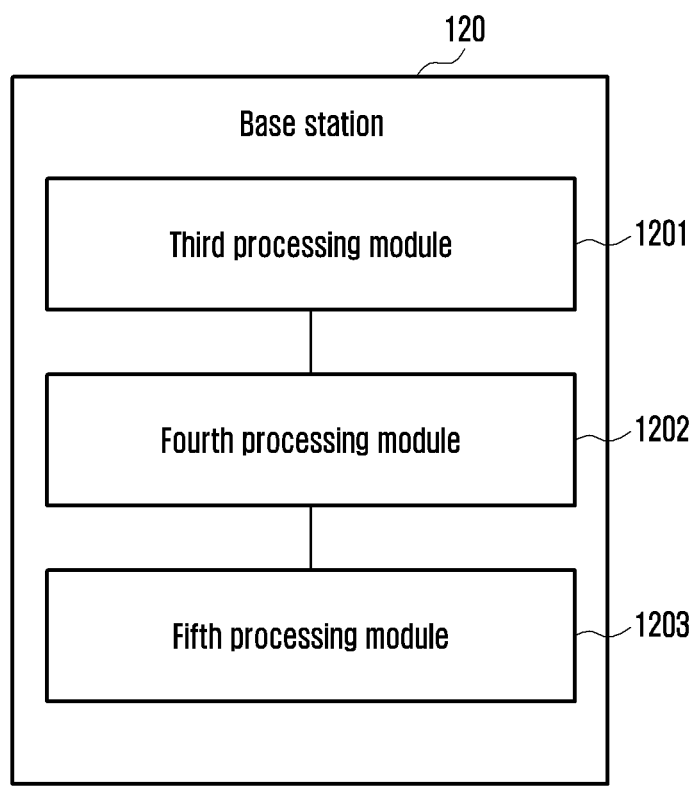
FIG. 12 is a schematic structural diagram of a base station according to an embodiment of the present application.

Based on the same inventive concept of the first and second embodiment, the embodiment of the present application further provides a base station, which is shown in FIG. 12, and the base station 120 includes a third processing module 1201, a fourth processing module 1202, and a fifth processing module 1203.

The third processing module 1201 is configured to transmit configuration information of one or more SPS PDSCH configurations to the UE;

The fourth processing module 1202 is configured to transmit, to the UE, the HARQ-ACK feedback timing, for the UE to determine a HARQ-ACK codebook, an uplink time unit where the HARQ-ACK is located, and an PUCCH resource in the uplink time unit according to the configuration information of the SPS PDSCH configuration and the HARQ-ACK feedback timing;

The fifth processing module 1203 is configured to receive HARQ-ACK feedback of the UE.

Alternatively, the fourth processing module 1202 is configured to transmit, to the UE, the HARQ-ACK feedback timing, for the UE to determine the PUCCH resource of first SPS PDSCH according to the HARQ-ACK feedback timing; transmit, to the UE, the time offset of the adjacent PUCCH resources, for the UE to determine the PUCCH resource of each SPS PDSCH according to the time offset of the adjacent PUCCH resources; transmit a PUCCH period to the UE, for determining, by the UE, a PUCCH resource of each SPS PDSCH according to a time offset of the adjacent PUCCH resource; transmit a threshold to the UE.

Alternatively, the third processing module 1201 is configured to transmit, to the UE, configuration information of the SPS PDSCH configuration which includes the multiple PUCCH resources, where the maximum number of HARQ-ACK bits that can be supported by each PUCCH resource is different; or, transmit, to the UE, the configuration information of the SPS PDSCH configuration which includes a first PUCCH resource for transmitting HARQ-ACK of each SPS PDSCH configuration and a second PUCCH resource for transmitting HARQ-ACKs of multiple SPS PDSCH configurations.

Applying the embodiments of the present application has at least the following beneficial effects:

The HARQ-ACK feedback efficiency of the SPS PDSCH is improved.

For the content that is not described in detail in the base station provided by the embodiment, refer to the method for the HARQ-ACK feedback of the semi-persistent scheduling data, the beneficial effects that the base station provided by the embodiment of the present application can achieve are the same as the method for the HARQ-ACK feedback of the semi-persistent scheduling data, and are not described herein again.

Embodiment 5

Figure 13:
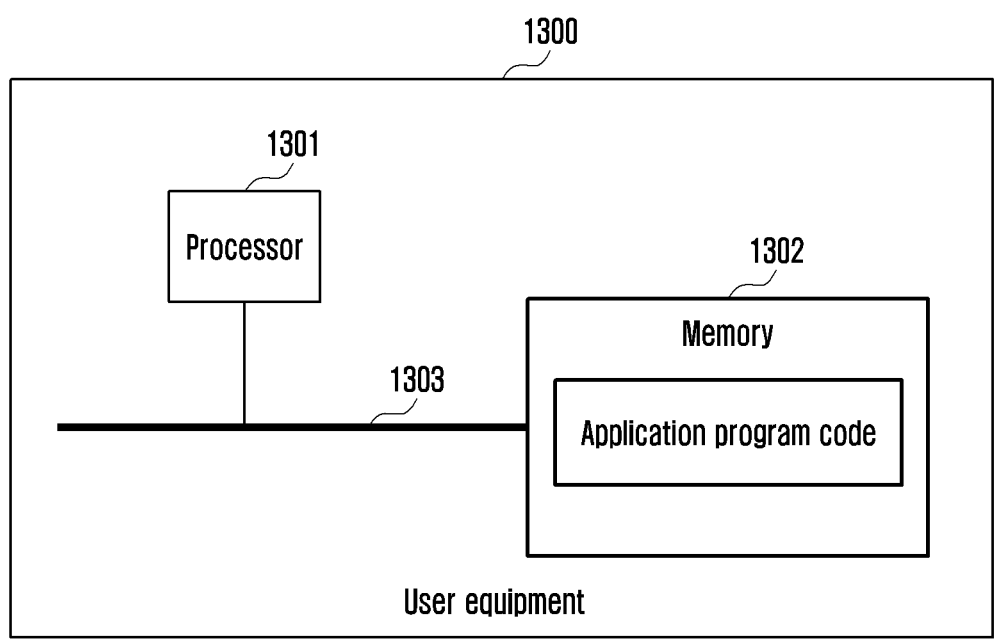
FIG. 13 is a schematic structural diagram of a user equipment according to an embodiment of the present application.

Based on the same inventive concept of the first and second embodiments, the embodiment of the present application further provides a user equipment. The schematic diagram of the user equipment is shown in FIG. 13. The electronic device 1300 includes at least one processor 1301, a memory 1302, and a bus 1303, wherein at least one processor 1301 is electrically coupled to the memory 1302; the memory 1302 is configured to store at least one computer executable instruction, and the processor 1301 is configured to execute the at least one computer executable instruction to perform the steps of the method for performing the HARQ-ACK feedback of any one of the semi-persistent scheduling data provided by any one of embodiment or any optional embodiment of the UE side in the first and second embodiment of the present application.

Further, the processor 1301 may be a Field-Programmable Gate Array (FPGA) or other device with logic processing capability, such as Microcontroller Unit (MCU), Central Process Unit (CPU).

Applying the embodiments of the present application has at least the following beneficial effects:

The HARQ-ACK feedback efficiency of the SPS PDSCH is improved.

Embodiment 6

Figure 14:
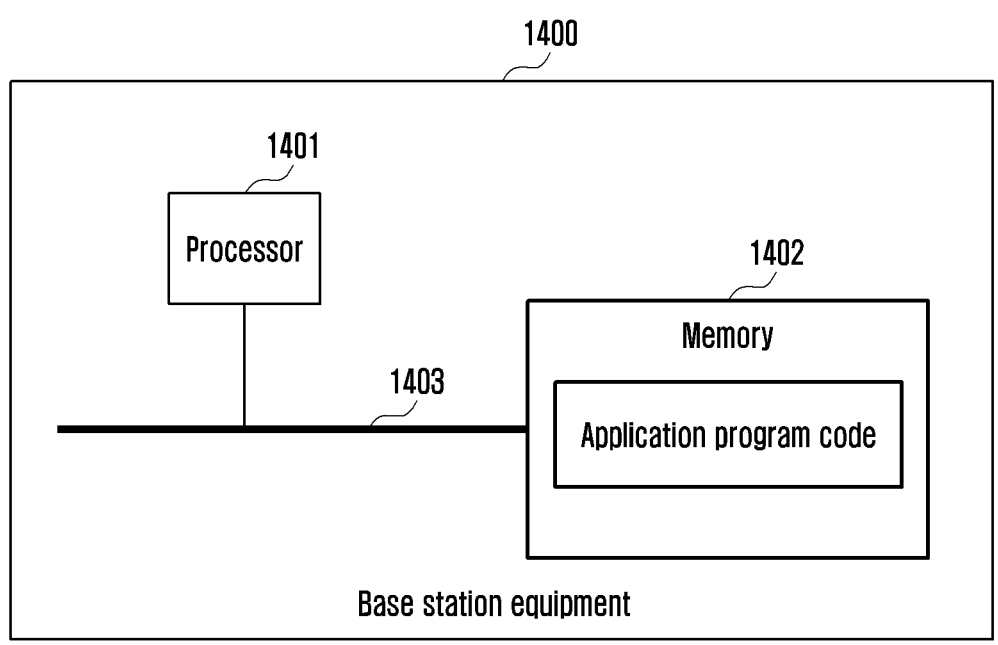
FIG. 14 is a schematic structural diagram of a base station device according to an embodiment of the present application.

Based on the same inventive concept of the first and second embodiment, the embodiment of the present application further provides a base station device. The schematic structural diagram of the base station device is as shown in FIG. 14. The electronic device 1400 includes at least one processor 1401, a memory 1402, and a bus 1403, wherein at least one processor 1401 is electrically coupled to a memory 1402; the memory 1402 is configured to store at least one computer executable instruction, and the processor 1401 is configured to execute the at least one computer executable instruction to perform the steps of the method for performing the HARQ-ACK feedback of any one of the semi-persistent scheduling data provided by any one of embodiment or any optional embodiment of the base station side in the first and second embodiment of the present application.

Further, the processor 1401 may be a Field-Programmable Gate Array (FPGA) or other devices with logic processing capabilities, such as Microcontroller Unit (MCU), Central Process Unit (CPU).

Applying the embodiments of the present application has at least the following beneficial effects:

The HARQ-ACK feedback efficiency of the SPS PDSCH is improved.

Example 7

Based on the same inventive concept of the first and second embodiment, the embodiment of the present application provides a computer readable storage medium, where stores the computer program used to implement, when executed by the processor, the steps of the method of any one of embodiment or the HARQ-ACK feedback of any one of the semi-persistent scheduling data of the UE side in the first and second embodiment of the present application.

Applying the embodiments of the present application has at least the following beneficial effects:

The HARQ-ACK feedback efficiency of the SPS PDSCH is improved.

Example 8

Based on the same inventive concept of the first and second embodiment, the embodiment of the present application provides another computer readable storage medium, where stores the computer program used to implement, when executed by the processor, the steps of the method of any one of embodiment or the HARQ-ACK feedback of any one of the semi-persistent scheduling data of the base station side in the first and second embodiment of the present application.

The computer readable storage medium provided by the embodiments of the present application includes, but is not limited to, any type of disk (including a floppy disk, a hard disk, an optical disk, a CD-ROM, and a magneto-optical disk), a Read-Only Memory (ROM), a Random Access Memory (RAM), Erasable Programmable Read-Only Memory (EPROM), Electrically Erasable Programmable Read-Only Memory (EEPROM), Flash Memory, Magnetic Card or light card. That is, a readable storage medium includes any medium that is stored or transmitted by a device (e.g., a computer) in a readable form.

Applying the embodiments of the present application has at least the following beneficial effects:

The HARQ-ACK feedback efficiency of the SPS PDSCH is improved.

It may be understood by those skilled in the art that computer program instructions may be used to realize each block in structure diagrams and/or block diagrams and/or flowcharts as well as a combination of blocks in the structure diagrams and/or block diagrams and/or flowcharts. It may be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are performed by computers or other processors of programmable data processing means.

It may be understood by those skilled in the art that the operations, methods, steps in the flows, measures and solutions already discussed in the present invention may be alternated, changed, combined or deleted. Further, the operations, methods, other steps in the flows, measures and solutions already discussed in the present invention may also be alternated, changed, rearranged, decomposed, combined or deleted. Further, prior arts having the operations, methods, the steps in the flows, measures and solutions already discussed in the present invention may also be alternated, changed, rearranged, decomposed, combined or deleted.

The foregoing descriptions are merely preferred embodiments of the present application. It should be noted that, for a person of ordinary skilled in the art, various modifications and embellishments can be made without departing from the principle of the present application. Such modifications and embellishments shall be regarded as falling into the protection scope of the present application.

The invention claimed is:

1. A method performed by a terminal in a communication system, the method comprising:
receiving, from a base station, at least one semi-persistent scheduling physical downlink shared channel (SPS PDSCH) configuration and a list of physical uplink control channel (PUCCH) resources for hybrid automatic repeat request-acknowledgement (HARQ-ACK) information;
receiving, from the base station, at least one SPS PDSCH based on the at least one SPS PDSCH configuration;
identifying a PUCCH resource among the list of PUCCH resources based on a number of bits for HARQ-ACK information of the at least one SPS PDSCH and a maximum number of bits for each of the PUCCH resources included in the list of PUCCH resources; and transmitting, to the base station, the HARQ-ACK information of the at least one SPS PDSCH based on the identified PUCCH resource.

2. The method of claim 1,
wherein the bits for the HARQ-ACK information of the at least one SPS PDSCH are ordered based on at least one SPS PDSCH configuration index of the at least one SPS PDSCH configuration and at least one serving cell index of at least one serving cell.

3. The method of claim 1, further comprising:
receiving, from the base station, downlink control information (DCI) for releasing one or more SPS PDSCH configurations among the at least one SPS PDSCH configuration;
identifying information on a location for HARQ-ACK information of release of the one or more SPS PDSCH configurations based on a location of HARQ-ACK information of a SPS PDSCH received according to a SPS PDSCH configuration having a lowest SPS PDSCH configuration index among the one or more SPS PDSCH configurations; and
transmitting, to the base station, the HARQ-ACK information of release of the one or more SPS PDSCH configurations based on the information.

4. The method of claim 1,
wherein in case that first HARQ-ACK codebook and second HARQ-ACK codebook are configured in the terminal, each of the at least one SPS PDSCH configuration includes a HARQ-ACK codebook index indicating a HARQ-ACK codebook for a corresponding SPS PDSCH.

5. The method of claim 1, further comprising:
receiving, from the base station, downlink control information (DCI) for scheduling a PDSCH,
wherein in case that first HARQ-ACK codebook and second HARQ-ACK codebook are configured in the terminal, the DCI for scheduling the PDSCH includes DCI for the first HARQ-ACK codebook or DCI for the second HARQ-ACK codebook, and
wherein in case that a size of the DCI for the first HARQ-ACK codebook is larger than a size of the DCI for the second HARQ-ACK codebook, at least one bit with a predetermined value is inserted to the DCI for the second HARQ-ACK codebook until the size of the DCI for the first HARQ-ACK codebook is equal to the size of the DCI for the second HARQ-ACK codebook.

6. A method performed by a base station in a communication system, the method comprising:
transmitting, to a terminal, at least one semi-persistent scheduling physical downlink shared channel (SPS PDSCH) configuration and a list of physical uplink control channel (PUCCH) resources for hybrid automatic repeat request-acknowledgement (HARQ-ACK) information;
transmitting, to the terminal, at least one SPS PDSCH based on the at least one SPS PDSCH configuration; and
receiving, from the terminal, HARQ-ACK information of the at least one SPS PDSCH based on a PUCCH resource among the list of PUCCH resources,
wherein the PUCCH resource is identified based on a number of bits for the HARQ-ACK information of the at least one SPS PDSCH and a maximum number of bits for each of the PUCCH resources included in the list of PUCCH resources.

7. The method of claim 6,
wherein the bits for the HARQ-ACK information of the at least one SPS PDSCH are ordered based on at least one SPS PDSCH configuration index of the at least one SPS PDSCH configuration and at least one serving cell index of at least one serving cell.

8. The method of claim 6, further comprising:
transmitting, to the terminal, downlink control information (DCI) for releasing one or more SPS PDSCH configurations among the at least one SPS PDSCH configuration; and
receiving, from the terminal, HARQ-ACK information of release of the one or more SPS PDSCH configurations based on information on a location for HARQ-ACK information of release of the one or more SPS PDSCH configurations,
wherein the information on the location for the HARQ-ACK information of release of the one or more SPS PDSCH configurations is based on a location of HARQ-ACK information of a SPS PDSCH received according to a SPS PDSCH configuration having a lowest SPS PDSCH configuration index among the one or more SPS PDSCH configurations.

9. The method of claim 6,
wherein in case that first HARQ-ACK codebook and second HARQ-ACK codebook are configured in the terminal, each of the at least one SPS PDSCH configuration includes a HARQ-ACK codebook index indicating a HARQ-ACK codebook for a corresponding SPS PDSCH.

10. The method of claim 6, further comprising:
transmitting, to the terminal, downlink control information (DCI) for scheduling a PDSCH,
wherein in case that first HARQ-ACK codebook and second HARQ-ACK codebook are configured in the terminal, the DCI for scheduling the PDSCH includes DCI for the first HARQ-ACK codebook or DCI for the second HARQ-ACK codebook, and
wherein in case that a size of the DCI for the first HARQ-ACK codebook is larger than a size of the DCI for the second HARQ-ACK codebook, at least one bit with a predetermined value is inserted to the DCI for the second HARQ-ACK codebook until the size of the DCI for the first HARQ-ACK codebook is equal to the size of the DCI for the second HARQ-ACK codebook.

11. A terminal in a communication system, the terminal comprising:
a transceiver; and
a controller coupled with the transceiver and configured to:
receive, from a base station, at least one semi-persistent scheduling physical downlink shared channel (SPS PDSCH) configuration and a list of physical uplink control channel (PUCCH) resources for hybrid automatic repeat request-acknowledgement (HARQ-ACK) information,
receive, from the base station, at least one SPS PDSCH based on the at least one SPS PDSCH configuration,
identify a PUCCH resource among the list of PUCCH resources based on a number of bits for HARQ-ACK information of the at least one SPS PDSCH and a maximum number of bits for each of the PUCCH resources included in the list of PUCCH resources, and
transmit, to the base station, the HARQ-ACK information of the at least one SPS PDSCH based on the identified PUCCH resource.

12. The terminal of claim 11,
wherein the bits for the HARQ-ACK information of the at least one SPS PDSCH are ordered based on at least one SPS PDSCH configuration index of the at least one SPS PDSCH configuration and at least one serving cell index of at least one serving cell.

13. The terminal of claim 11, wherein the controller is further configured to:
receive, from the base station, downlink control information (DCI) for releasing one or more SPS PDSCH configurations among the at least one SPS PDSCH configuration,
identify information on a location for HARQ-ACK information of release of the one or more SPS PDSCH configurations based on a location of HARQ-ACK information of a SPS PDSCH received according to a SPS PDSCH configuration having a lowest SPS PDSCH configuration index among the one or more SPS PDSCH configurations, and
transmit, to the base station, the HARQ-ACK information of release of the one or more SPS PDSCH configurations based on the information.

14. The terminal of claim 11,
wherein in case that first HARQ-ACK codebook and second HARQ-ACK codebook are configured in the terminal, each of the at least one SPS PDSCH configuration includes a HARQ-ACK codebook index indicating a HARQ-ACK codebook for a corresponding SPS PDSCH.

15. The terminal of claim 11, wherein the controller is further configured to:
receive, from the base station, downlink control information (DCI) for scheduling a PDSCH,
wherein in case that first HARQ-ACK codebook and second HARQ-ACK codebook are configured in the terminal, the DCI for scheduling the PDSCH includes DCI for the first HARQ-ACK codebook or DCI for the second HARQ-ACK codebook, and
wherein in case that a size of the DCI for the first HARQ-ACK codebook is larger than a size of the DCI for the second HARQ-ACK codebook, at least one bit with a predetermined value is inserted to the DCI for the second HARQ-ACK codebook until the size of the DCI for the first HARQ-ACK codebook is equal to the size of the DCI for the second HARQ-ACK codebook.

16. A base station in a communication system, the base station comprising:
a transceiver; and
a controller coupled with the transceiver and configured to:
transmit, to a terminal, at least one semi-persistent scheduling physical downlink shared channel (SPS PDSCH) configuration and a list of physical uplink control channel (PUCCH) resources for hybrid automatic repeat request-acknowledgement (HARQ-ACK) information,
transmit, to the terminal, at least one SPS PDSCH based on the at least one SPS PDSCH configuration, and
receive, from the terminal, HARQ-ACK information of the at least one SPS PDSCH based on a PUCCH resource among the list of PUCCH resources,
wherein the PUCCH resource is identified based on a number of bits for the HARQ-ACK information of the at least one SPS PDSCH and a maximum number of bits for each of the PUCCH resources included in the list of PUCCH resources.

17. The base station of claim 16,
wherein the bits for the HARQ-ACK information of the at least one SPS PDSCH are ordered based on at least one SPS PDSCH configuration index of the at least one SPS PDSCH configuration and at least one serving cell index of at least one serving cell.

18. The base station of claim 16, wherein the controller is further configured to:
transmit, to the terminal, downlink control information (DCI) for releasing one or more SPS PDSCH configurations among the at least one SPS PDSCH configuration; and
receive, from the terminal, HARQ-ACK information of release of the one or more SPS PDSCH configurations based on information on a location for HARQ-ACK information of release of the one or more SPS PDSCH configurations,
wherein the information on the location for the HARQ-ACK information of release of the one or more SPS PDSCH configurations is based on a location of HARQ-ACK information of a SPS PDSCH received according to a SPS PDSCH configuration having a lowest SPS PDSCH configuration index among the one or more SPS PDSCH configurations.

19. The base station of claim 16,
wherein in case that first HARQ-ACK codebook and second HARQ-ACK codebook are configured in the terminal, each of the at least one SPS PDSCH configuration includes a HARQ-ACK codebook index indicating a HARQ-ACK codebook for a corresponding SPS PDSCH.

20. The base station of claim 16, wherein the controller is further configured to:
transmit, to the terminal, downlink control information (DCI) for scheduling a PDSCH,
wherein in case that first HARQ-ACK codebook and second HARQ-ACK codebook are configured in the terminal, the DCI for scheduling the PDSCH includes DCI for the first HARQ-ACK codebook or DCI for the second HARQ-ACK codebook, and
wherein in case that a size of the DCI for the first HARQ-ACK codebook is larger than a size of the DCI for the second HARQ-ACK codebook, at least one bit with a predetermined value is inserted to the DCI for the second HARQ-ACK codebook until the size of the DCI for the first HARQ-ACK codebook is equal to the size of the DCI for the second HARQ-ACK codebook.

* * * * *